US012677297B2

(12) United States Patent
Lee et al.

(10) Patent No.: US 12,677,297 B2
(45) Date of Patent: Jul. 7, 2026

(54) METHOD AND APPARATUS FOR PERFORMING SL DRX OPERATION IN NR V2X

(71) Applicant: LG ELECTRONICS INC., Seoul (KR)

(72) Inventors: Seungmin Lee, Seoul (KR); Giwon Park, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 18/259,118

(22) PCT Filed: Dec. 24, 2021

(86) PCT No.: PCT/KR2021/019811

§ 371 (c)(1),
(2) Date: Jun. 23, 2023

(87) PCT Pub. No.: WO2022/139541

PCT Pub. Date: Jun. 30, 2022

(65) Prior Publication Data

US 2024/0057122 A1 Feb. 15, 2024

Related U.S. Application Data

(60) Provisional application No. 63/138,737, filed on Jan. 18, 2021, provisional application No. 63/136,583, (Continued)

(30) Foreign Application Priority Data

Dec. 31, 2020 (KR) ........................ 10-2020-0189945

(51) Int. Cl.
*H04W 72/25* (2023.01)
*H04W 72/1263* (2023.01)
*H04W 76/28* (2018.01)

(52) U.S. Cl.
CPC ....... *H04W 72/25* (2023.01); *H04W 72/1263* (2013.01); *H04W 76/28* (2018.02)

(58) Field of Classification Search
CPC . H04W 72/25; H04W 72/1263; H04W 76/28; H04W 4/70; H04W 52/0216;
(Continued)

(56) References Cited

U.S. PATENT DOCUMENTS

2021/0144570 A1* 5/2021 Chae ..................... H04W 72/02
2021/0227464 A1* 7/2021 Kung ................... H04W 76/14
(Continued)

FOREIGN PATENT DOCUMENTS

EP 3706348 9/2020

OTHER PUBLICATIONS

3GPP TSG-RAN WG2 Meeting #112 electronic Agenda Item 8.15.2 Title Consideration on the sidelink DRX for unicast, groupcast and broadcast â R2-2009413 Dated Nov. 2-3, 2020 (Year: 2020).*
(Continued)

*Primary Examiner* — Nizar N Sivji
(74) *Attorney, Agent, or Firm* — LEE, HONG, DEGERMAN, KANG & WAIMEY

(57) ABSTRACT

Provided are a method by which a first device performs wireless communication, and an apparatus supporting same. The method may comprise the steps of: acquiring at least one sidelink (SL) discontinuous reception (DRX) configuration; receiving, from a second device, first sidelink control information (SCI) for scheduling a physical sidelink shared channel (PSSCH) through a physical sidelink control channel (PSCCH), on the basis of an SL DRX configuration from
(Continued)

obtaining at least one SL DRX configuration — S1510 transmitting, to first device through PSCCH, first SCI for scheduling of PSSCH, based on SL DRX configuration among at least one SL DRX configuration — S1520 transmitting, to first device through PSSCH, second SCI including source ID and destination ID, and MAC PDU — S1530 among the at least one SL DRX configuration; and receiving, from the second device, second SCI including a source ID and a destination ID, and a medium access control (MAC) protocol data unit (PDU) through the PSSCH.

18 Claims, 16 Drawing Sheets

Related U.S. Application Data filed on Jan. 12, 2021, provisional application No. 63/132,467, filed on Dec. 30, 2020, provisional application No. 63/130,432, filed on Dec. 24, 2020.

(58) Field of Classification Search
CPC ......... H04W 52/0219; H04W 52/0229; H04W 92/18; H04W 4/40; H04W 52/028; Y02D 30/70

See application file for complete search history.

(56) References Cited

U.S. PATENT DOCUMENTS

| | | | | |
|---|---|---|---|---|
| 2021/0227622 A1* | 7/2021 | Kung | .................... | H04W 76/28 |
| 2022/0150730 A1* | 5/2022 | Freda | ....................... | H04L 1/188 |
| 2023/0014303 A1* | 1/2023 | Di Girolamo | ........ | H04W 72/20 |
| 2023/0345559 A1* | 10/2023 | Li | ........................ | H04W 76/23 |

OTHER PUBLICATIONS

3GPP TSG RAN Meeting #86 RP-193231 Title New WID on NR sidelink enhancement Dated Dec. 9-12, 2019 (Year: 2019).*
European Patent Office Application Serial No. 21911606.8, Search Report dated Oct. 11, 2024, 14 pages.
Huawei et al., "Consideration on the sidelink DRX for unicast, groupcast and broadcast," R2-2009413, 3GPP TSG-RAN WG2 Meeting #112 electronic, Oct. 2020, 8 pages.
LG Electronics, "Discussion on physical layer design considering sidelink DRX operation," R1-2007897, 3GPP TSG RAN WG1 #103-e, E-Meeting, Nov. 2020, 15 pages.
Session Chair (Samsung), "Report from session on LTE V2X AND NR V2X," R2-2010708, 3GPP TSG-RAN WG2 Meeting #112 electronic, Online, Nov. 2020, 31 pages.

* cited by examiner

BS(e.g. eNB or gNB)

UE 1                   UE 2

| BS | UE 1 | UE 2 | | UE 1 | UE 2 |

PDCCH

PSCCH

PSSCH

PSCCH

PSSCH (a)                            (b)

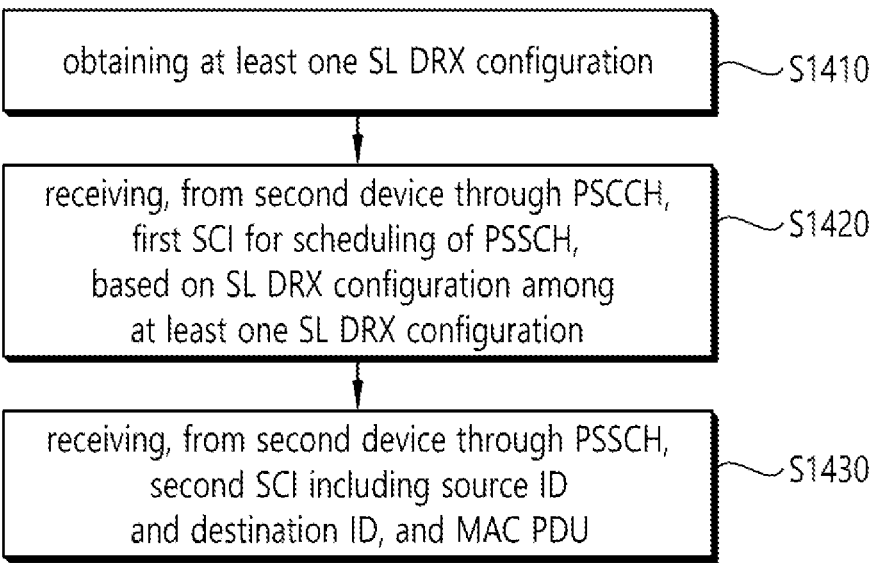

obtaining at least one SL DRX configuration — S1410 receiving, from second device through PSCCH,
first SCI for scheduling of PSSCH,
based on SL DRX configuration among
at least one SL DRX configuration — S1420 receiving, from second device through PSSCH,
second SCI including source ID
and destination ID, and MAC PDU — S1430

FIG. 15

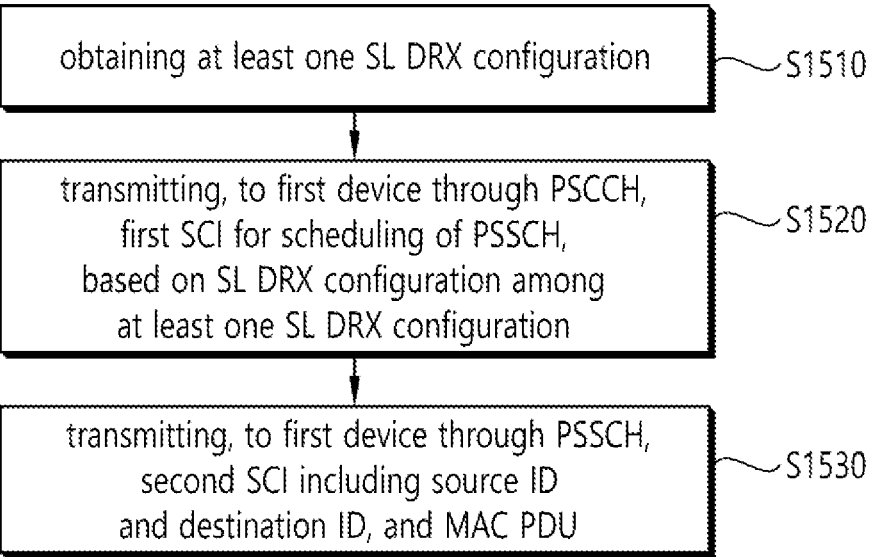

obtaining at least one SL DRX configuration — S1510 transmitting, to first device through PSCCH,
first SCI for scheduling of PSSCH,
based on SL DRX configuration among
at least one SL DRX configuration — S1520 transmitting, to first device through PSSCH,
second SCI including source ID
and destination ID, and MAC PDU — S1530

1000(102/106, 202/206)

Device (100,200)

METHOD AND APPARATUS FOR PERFORMING SL DRX OPERATION IN NR V2X

CROSS-REFERENCE TO RELATED APPLICATIONS

This application is the National Stage filing under 35 U.S.C. 371 of International Application No. PCT/KR2021/019811, filed on Dec. 24, 2021, which claims the benefit of earlier filing date and right of priority to Korean Application No. 10-2020-0189945, filed on Dec. 31, 2020, and also claims the benefit of U.S. Provisional Application No. 63/130,432, filed on Dec. 24, 2020, 63/132,467, filed on Dec. 30, 2020, 63/136,583, filed on Jan. 12, 2021, and 63/138,737, filed on Jan. 18, 2021, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

Figure 1:
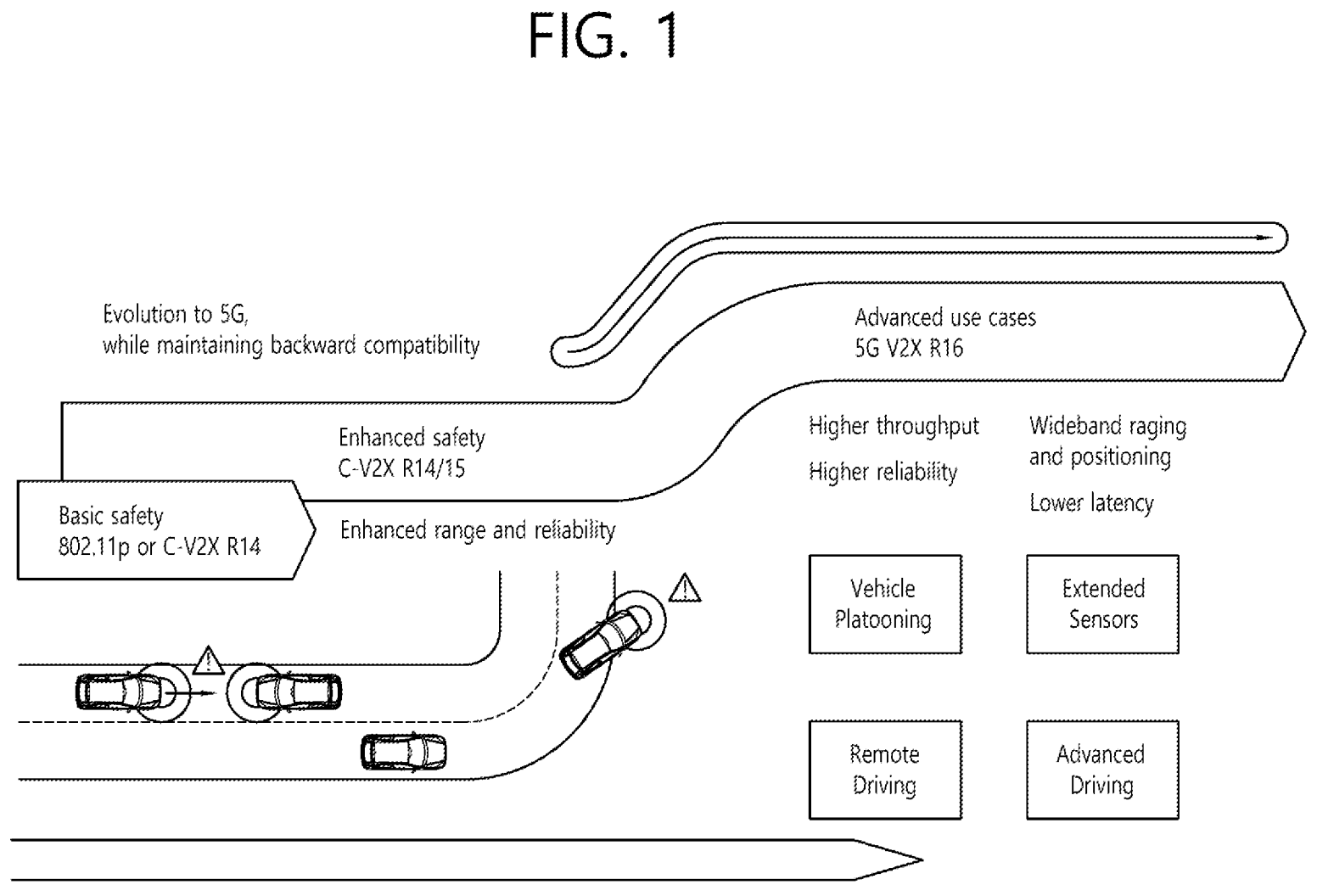

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, aligning (as much as possible) wake-up times (related to SL DRX) between power saving UEs (P-UEs) may be a method of reducing power consumption. In this case, a problem is how to determine an entity that (finally) determines a wake-up time (related to SL DRX). Furthermore, in order to reduce power consumption, a Uu DRX related wake-up time and an SL DRX related wake-up time (from the P-UE perspective) should be aligned/adjacent to each other as much as possible. For this purpose, it is necessary to define an entity that (finally) determines a wake-up time (related to SL DRX (and/or Uu DRX)).

In an embodiment, provided is a method for performing wireless communication by a first device. The method may comprise: obtaining at least one sidelink (SL) discontinuous reception (DRX) configuration; receiving, from a second device through a physical sidelink control channel (PSCCH), first sidelink control information (SCI) for scheduling of a physical sidelink shared channel (PSSCH), based on an SL DRX configuration among the at least one SL DRX configuration; and receiving, from the second device through the PSSCH, second SCI including a source ID and a destination ID, and a medium access control (MAC) protocol data unit (PDU).

In an embodiment, provided is a first device adapted to perform wireless communication. The first device may comprise one or more memories storing instructions; one or more transceivers; and one or more processors connected to the one or more memories and the one or more transceivers. The one or more processors may execute the instructions to: obtain at least one sidelink (SL) discontinuous reception (DRX) configuration; receive, from a second device through a physical sidelink control channel (PSCCH), first sidelink control information (SCI) for scheduling of a physical sidelink shared channel (PSSCH), based on an SL DRX configuration among the at least one SL DRX configuration; and receive, from the second device through the PSSCH, second SCI including a source ID and a destination ID, and a medium access control (MAC) protocol data unit (PDU).

The UE can efficiently perform SL communication.

BRIEF DESCRIPTION OF THE DRAWINGS

FIG. 1 is a drawing for describing V2X communication based on NR, compared to V2X communication based on RAT used before NR.

FIG. 3 shows a radio protocol architecture, based on an embodiment of the present disclosure.

FIG. 5 shows a structure of a slot of an NR frame, based on an embodiment of the present disclosure.

FIG. 14 shows a method for performing wireless communication by a first device, based on an embodiment of the present disclosure.

FIG. 15 shows a method for performing wireless communication by a second device, based on an embodiment of the present disclosure.

DETAILED DESCRIPTION

Figure 2:
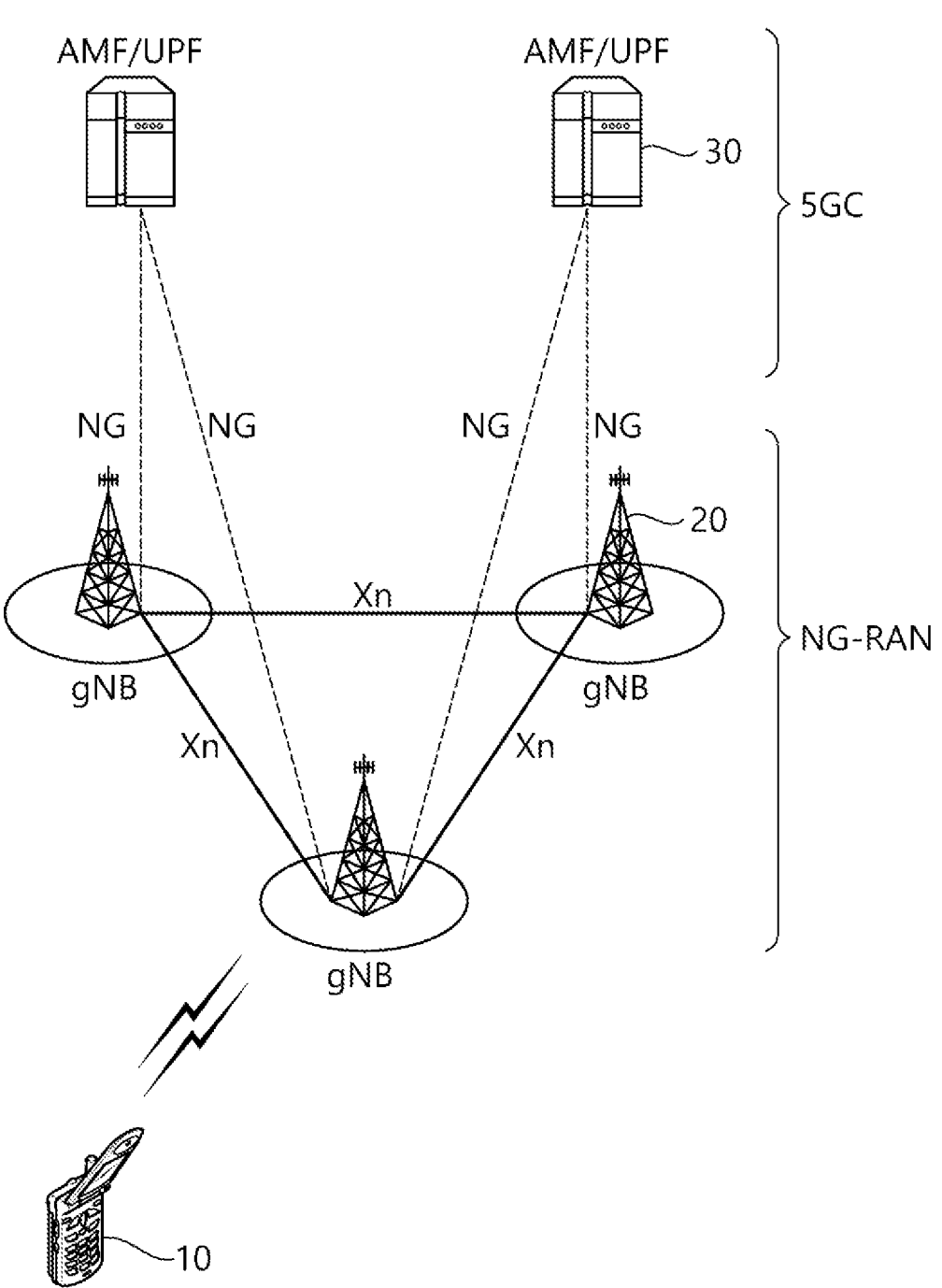
FIG. 2 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
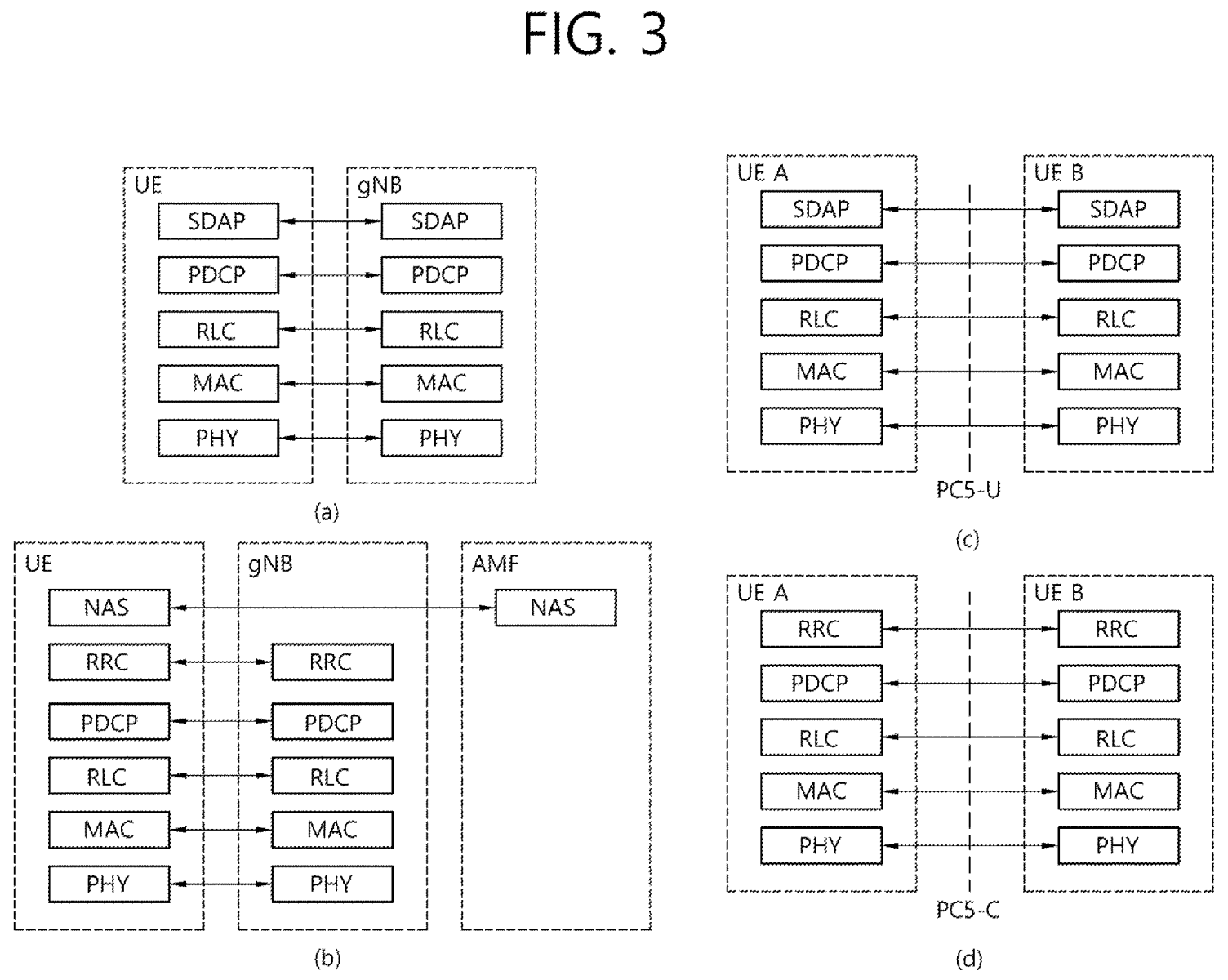

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
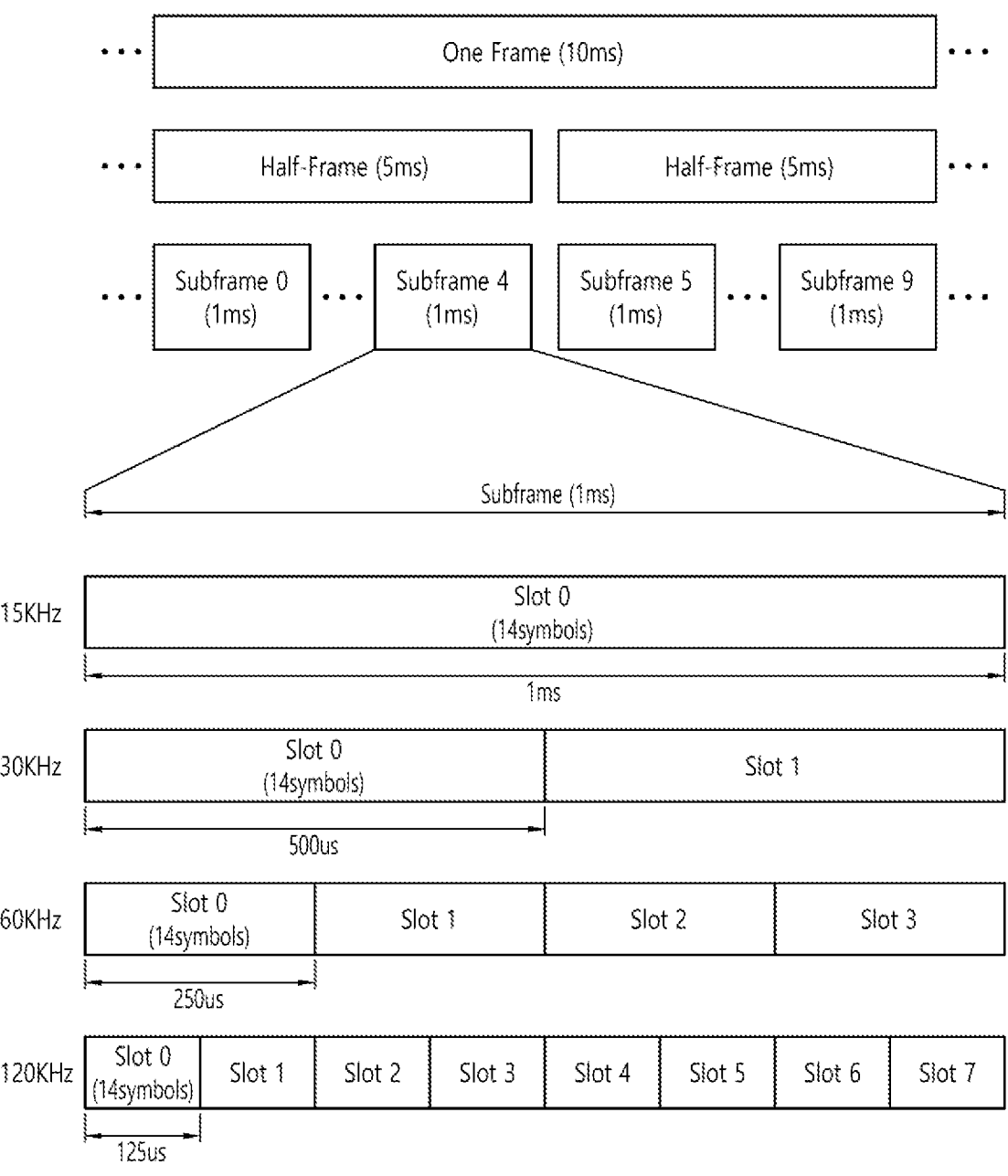
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

Figure 5:
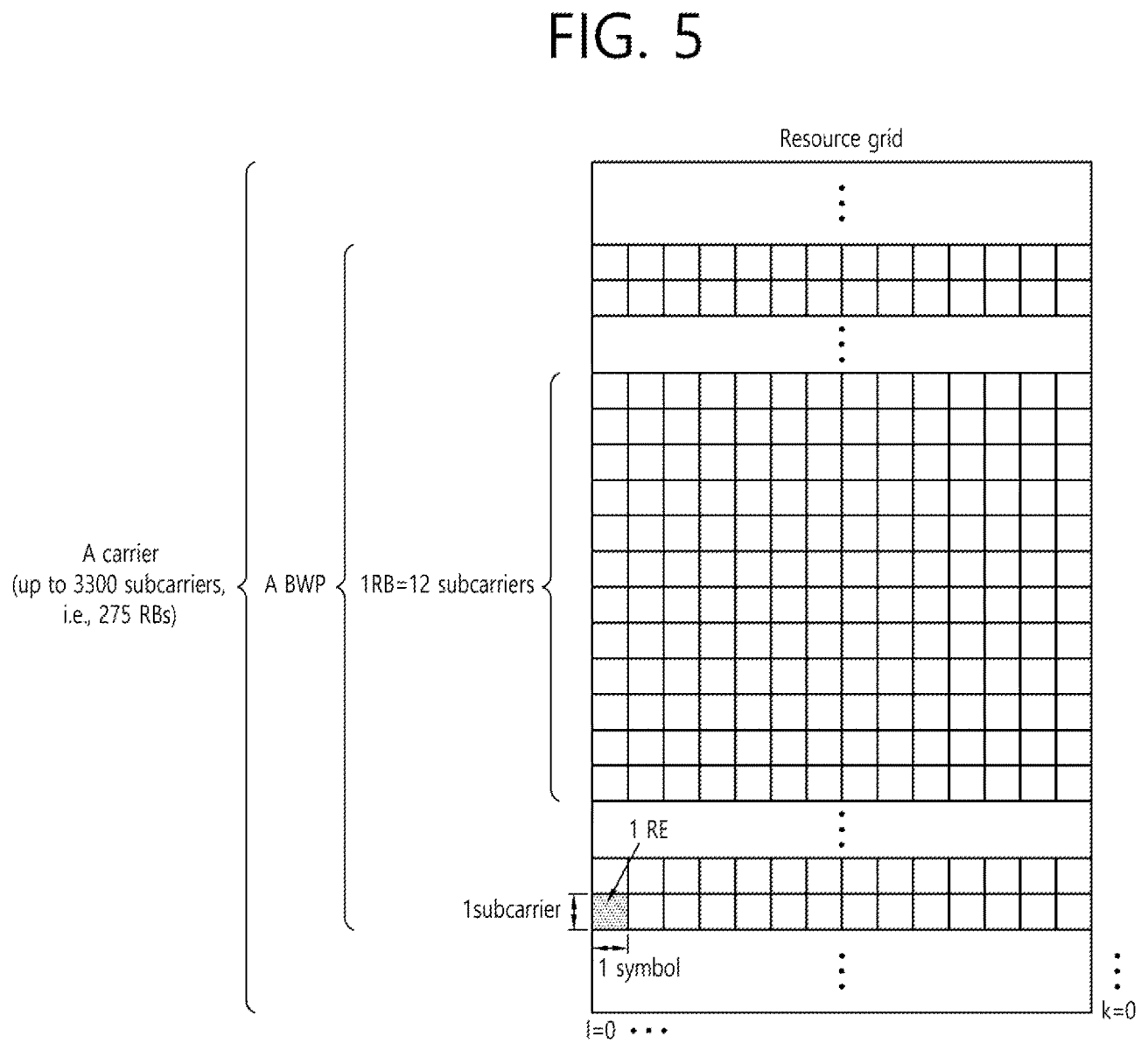

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
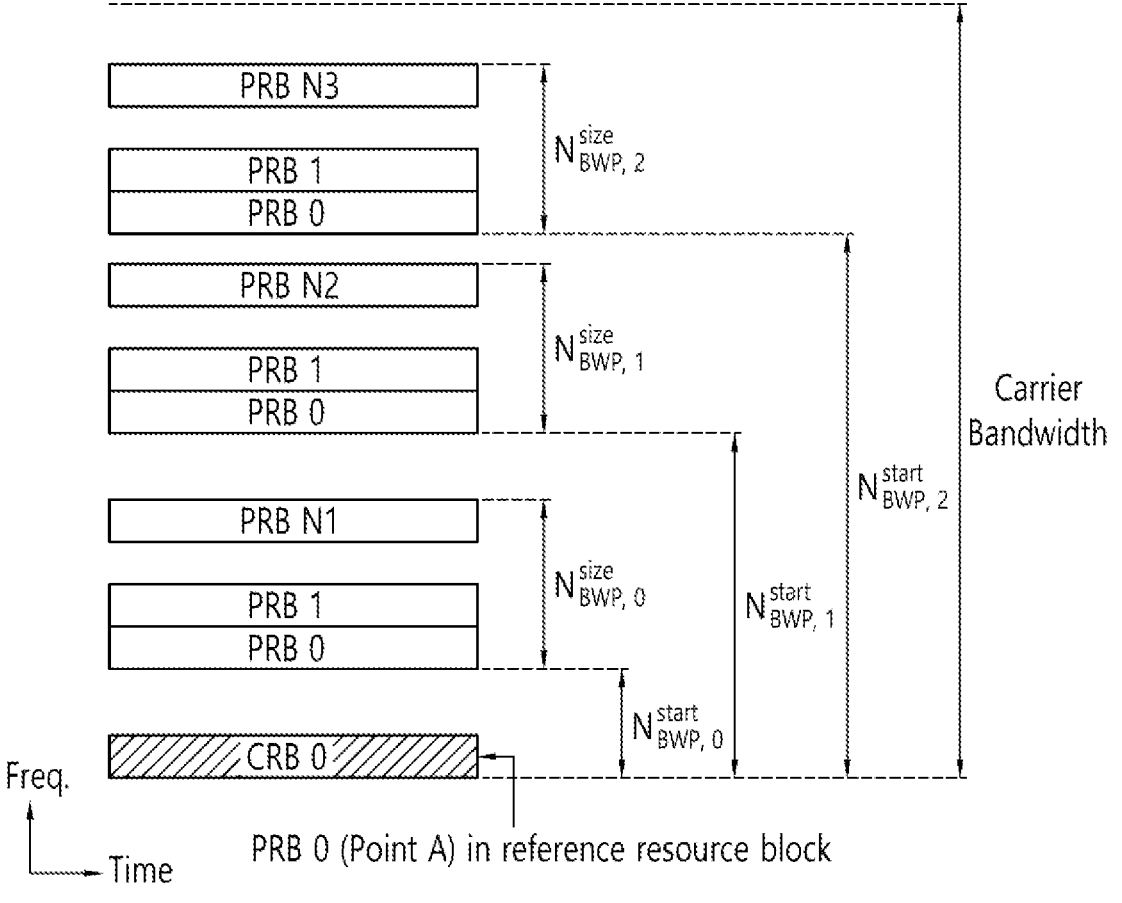
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
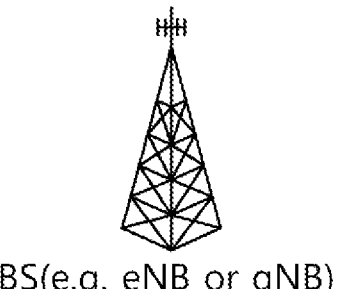
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
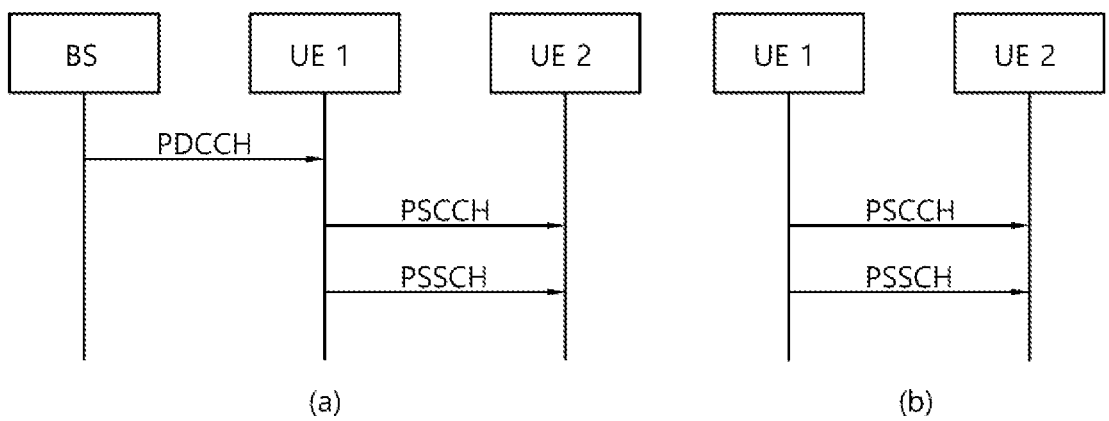
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
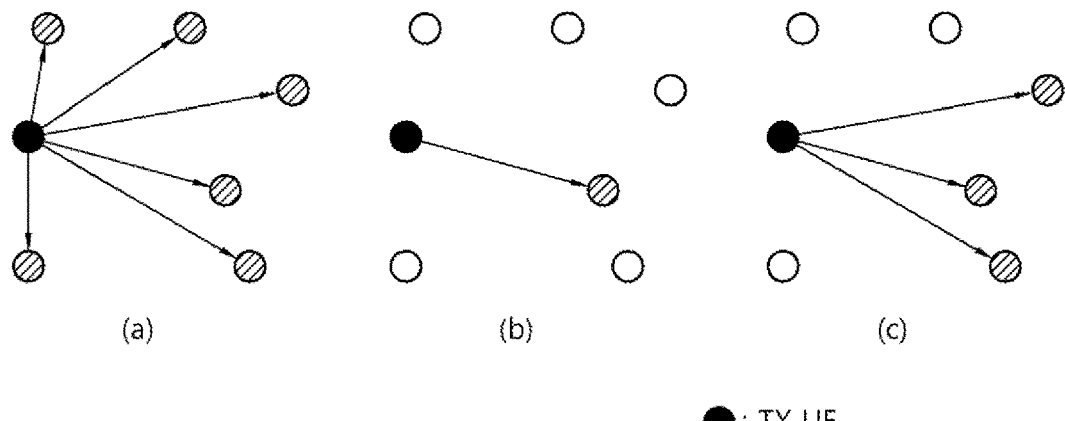
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
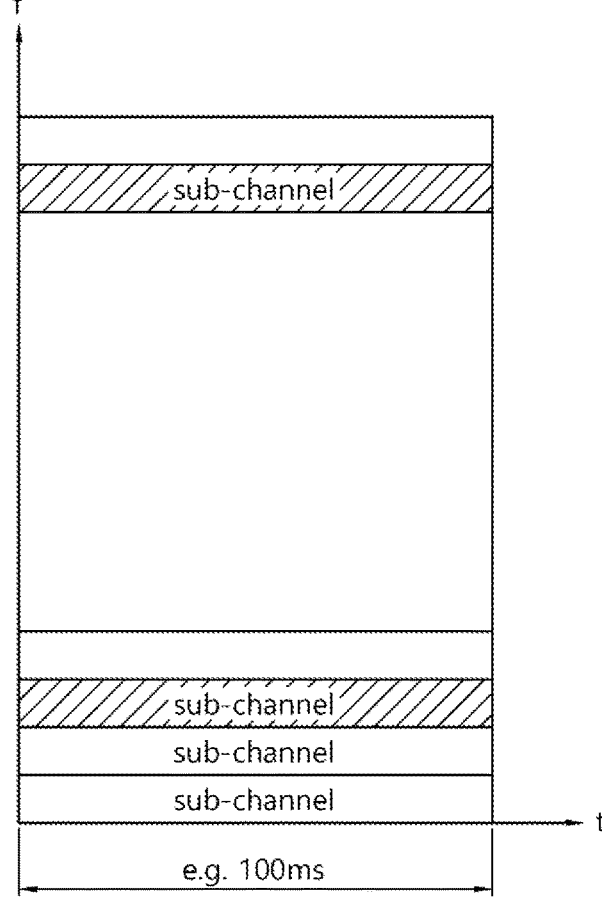
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value $CRlimit_k$ of a channel occupancy ratio k ($CR_k$) that can be occupied by traffic corresponding to each priority (e.g., k) based on the CBR. For example, the UE may derive the maximum value $CRlimit_k$ of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or Reference Signal Received Power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, a transmitting UE (i.e., TX UE) may be a UE which transmits data to a (target) receiving UE (i.e., RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal(s) (DM-RS(s))) and/or a SL (L1) RSRP report request indicator to be used for SL (L1) RSRP measurement to the (target) RX UE(s). For example, the TX UE may be a UE which transmits (control) channel(s) (e.g., PSCCH, PSSCH, etc.) and/or reference signal(s) (e.g., DM-RS(s), CSI-RS(s), etc.) on the (control) channel(s) to be used for a SL radio link monitoring (RLM) operation and/or a SL radio link failure (RLF) operation of the (target) RX UE.

Meanwhile, in the present disclosure, a receiving UE (i.e., RX UE) may be a UE which transmits SL HARQ feedback to a transmitting UE (i.e., TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE may be a UE which transmits, to the TX UE, a SL (L1) RSRP measurement value measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, a TX UE may transmit the entirety or part of information described below to the RX UE through SCI(s). Herein, for example, the TX UE may transmit the entirety or part of the information described below to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information

New data indicator (NDI) information

Redundancy version (RV) information (Transmission traffic/packet related) QoS information (e.g., priority information)

SL CSI-RS transmission indicator or information on the number of antenna ports for (transmitted) SL CSI-RS Location information of the TX UE or location (or distance region) information of the target RX UE (for which SL HARQ feedback is requested)

Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in the present disclosure, for example, a PSCCH may be replaced/substituted with at least one of a SCI, a first SCI (1$^{st}$-stage SCI), and/or a second SCI (2$^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa.

Meanwhile, in the present disclosure, for example, if SCI configuration fields are divided into two groups in consideration of a (relatively) high SCI payload size, an SCI including a first SCI configuration field group may be referred to as a first SCI or a P t SCI, and an SCI including a second SCI configuration field group may be referred to as a second SCI or a 2$^{nd}$ SCI. For example, the 1$^{st}$ SCI and the 2$^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

Meanwhile, in the present disclosure, for example, "configure/configured" or "define/defined" may refer to being (pre-)configured from a base station or a network. For example, "configure/configured" or "define/defined" may refer to being (pre-)configured for each resource pool from the base station or the network. For example, the base station or the network may transmit information related to "configuration" or "definition" to the UE. For example, the base station or the network may transmit information related to "configuration" or "definition" to the UE through pre-defined signaling. For example, the pre-defined signaling may include at least one of RRC signaling, MAC signaling, PHY signaling, and/or SIB.

Meanwhile, in the present disclosure, for example, "configure/configured" or "define/defined" may refer to being designated or configured through pre-configured signaling between UEs. For example, information related to "configuration" or "definition" may be transmitted or received pre-configured signaling between UEs. For example, the pre-defined signaling may include at least one of RRC signaling, MAC signaling, PHY signaling, and/or SIB.

Meanwhile, in the present disclosure, for example, RLF may be replaced/substituted with out-of-synch (OOS) and/or in-synch (IS), or vice versa.

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in the present disclosure, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Figure 11:
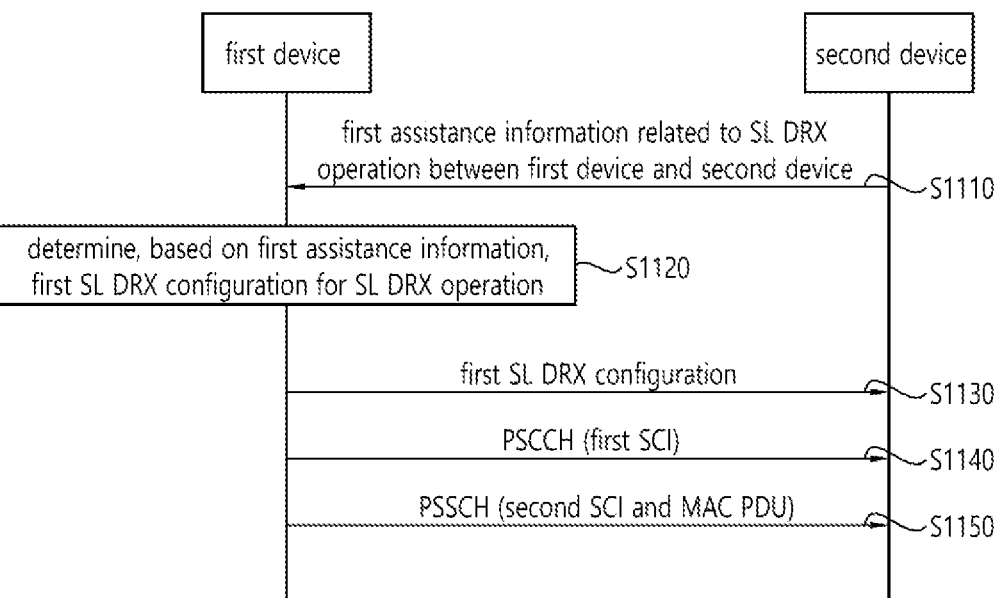
FIG. 11 shows a procedure for a first device and a second device to perform sidelink communication, based on an embodiment of the present disclosure.

FIG. 11 shows a procedure for a first device and a second device to perform sidelink communication, based on an embodiment of the present disclosure. The embodiment of FIG. 11 may be combined with various embodiments of the present disclosure.

In step S1110, the first device may receive, from the second device, first assistance information related to a sidelink (SL) discontinuous reception (DRX) operation between the first device and the second device.

In step S1120, the first device may determine, based on the first assistance information, a first SL DRX configuration for the SL DRX operation.

In step S1130, the first device may transmit the first SL DRX configuration to the second device.

In step S1140, the first device may transmit first SCI to the second device through a PSCCH based on the first SL DRX configuration.

In step S1150, the first device may transmit second SCI that is different from the first SCI and a MAC PDU to the second device through a PSSCH related to the PSCCH.

Figure 12:
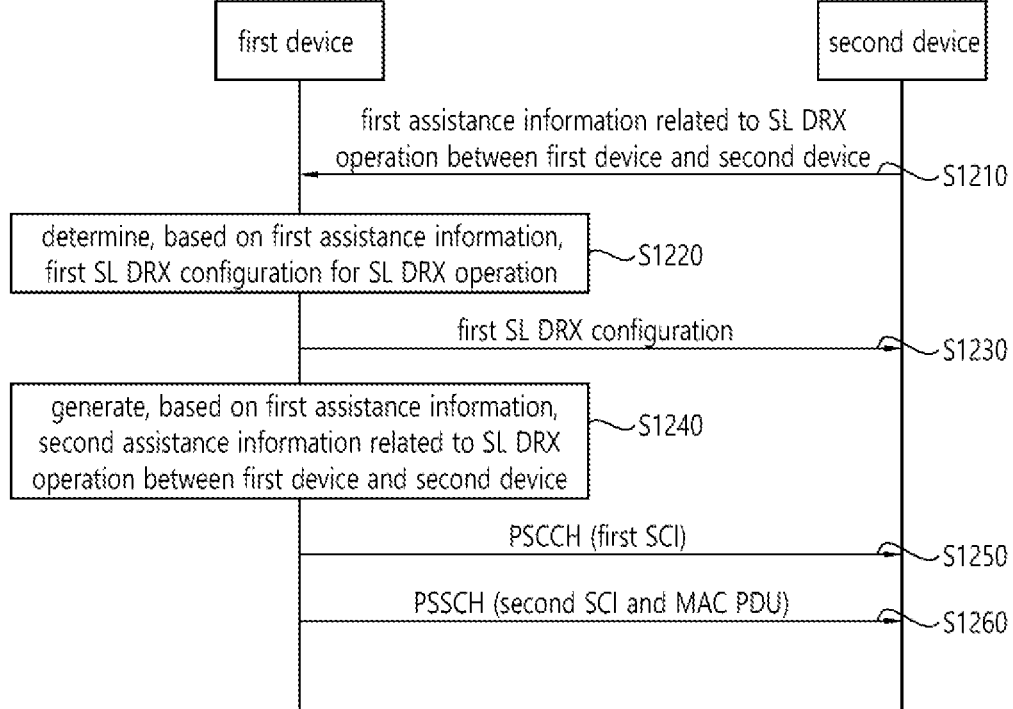
FIG. 12 shows a procedure for the first device and the second device to perform sidelink communication, based on an embodiment of the present disclosure.

FIG. 12 shows a procedure for the first device and the second device to perform sidelink communication, based on an embodiment of the present disclosure. The embodiment of FIG. 12 may be combined with various embodiments of the present disclosure.

In step S1210, the first device may receive, from the second device, first assistance information related to a sidelink (SL) discontinuous reception (DRX) operation between the first device and the second device.

In step S1220, the first device may determine, based on the first assistance information, a first SL DRX configuration for the SL DRX operation.

In step S1230, the first device may transmit the first SL DRX configuration to the second device.

In step S1240, the first device may generate, based on the first assistance information, second assistance information related to the SL DRX operation between the first device and the second device.

In step S1250, the first device may transmit first SCI to the second device through a PSCCH based on the first SL DRX configuration.

In step S1260, the first device may transmit second SCI that is different from the first SCI and a MAC PDU to the second device through a PSSCH related to the PSCCH. For example, the MAC PDU may include the second assistance information. Alternatively, for example, the first device may transmit, to the second device, an RRC message or a MAC PDU that includes the second assistance information.

Figure 13:
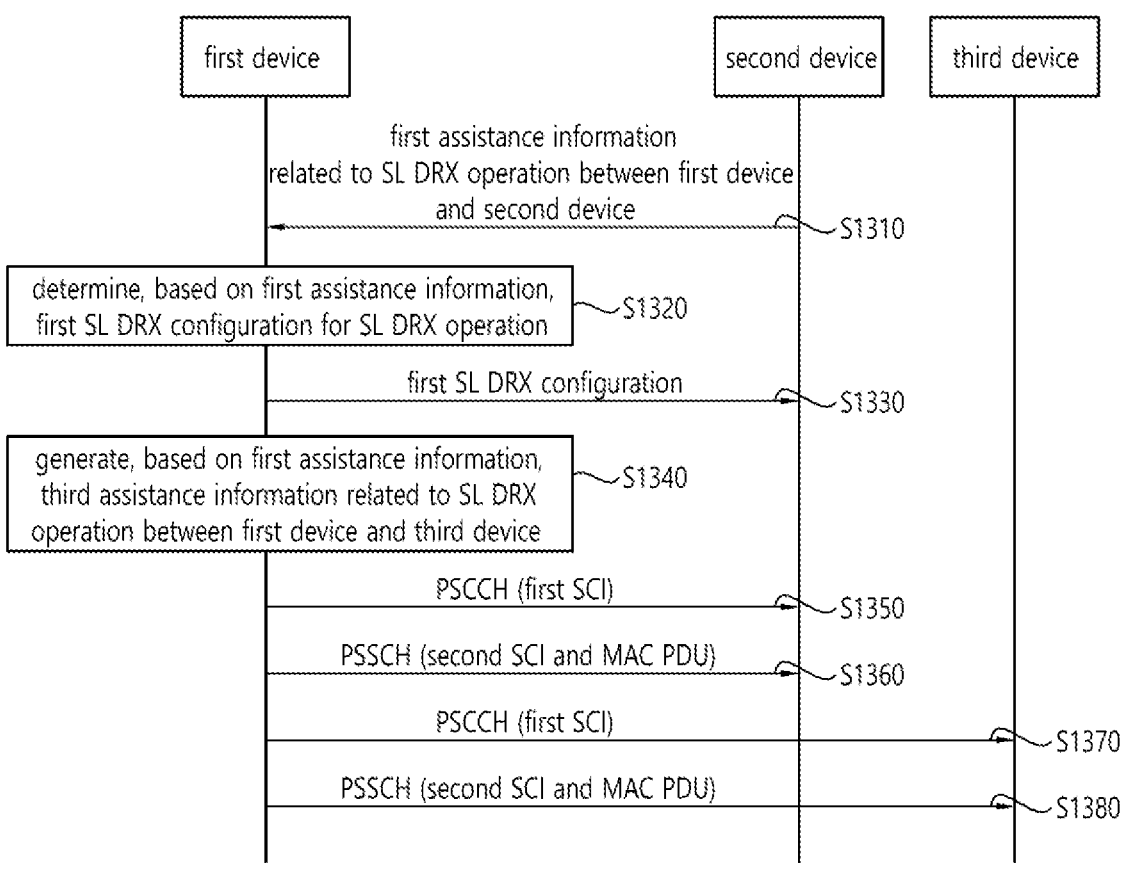
FIG. 13 shows a procedure for the first device, the second device, and the third device to perform sidelink communication, based on an embodiment of the present disclosure.

FIG. 13 shows a procedure for the first device, the second device, and the third device to perform sidelink communication, based on an embodiment of the present disclosure.

The embodiment of FIG. 13 may be combined with various embodiments of the present disclosure.

In step S1310, the first device may receive, from the second device, first assistance information related to a sidelink discontinuous reception (DRX) operation between the first device and the second device.

In step S1320, the first device may determine, based on the first assistance information, a first SL DRX configuration for the SL DRX operation.

In step S1330, the first device may transmit the first SL DRX configuration to the second device.

In step S1340, the first device may generate, based on the first assistance information, third assistance information related to the SL DRX operation between the first device and the third device.

In step S1350, the first device may transmit first SCI to the second device through a PSCCH based on the first SL DRX configuration.

In step S1360, the first device may transmit second SCI that is different from the first SCI and a MAC PDU to the second device through a PSSCH related to the PSCCH.

In step S1370, the first device may transmit first SCI to the third device through a PSCCH.

In step S1380, the first device may transmit second SCI that is different from the first SCI and a MAC PDU to the third device through a PSSCH related to the PSCCH. For example, the MAC PDU may include the third assistance information. Alternatively, for example, the first device may transmit, to the third device, an RRC message or a MAC PDU that includes the third assistance information.

Various embodiments are described below that are directly or indirectly related to at least one of steps S1110 to S1150 of FIGS. 11, S1210 to S1260 of FIG. 12, and S1310 to S1380 of FIG. 13.

For example, aligning (as much as possible) wake-up times (related to SL DRX) between power saving UEs (P-UEs) may be a method of reducing power consumption. In this case, a problem is how to determine an entity that (finally) determines a wake-up time (related to SL DRX). Furthermore, in order to reduce power consumption, a Uu DRX related wake-up time and an SL DRX related wake-up time (from the P-UE perspective) should be aligned/adjacent to each other as much as possible. For this purpose, it is necessary to define an entity that (finally) determines a wake-up time (related to SL DRX (and/or Uu DRX)).

For example, an entity that satisfies (some or all or a combination of) the following conditions may be configured to (finally) determine a wake-up time (and/or parameters) (related to SL DRX (and/or Uu DRX)) (e.g., it may be interpreted that a UE (and/or a base station and/or an RSU) receiving the wake-up time may follow it (as it is) and/or may adjust the (SL DRX (and/or Uu DRX)) wake-up time (and/or parameters) (related to itself or the corresponding entity) to align (as much as possible)). Herein, as another example, (if such a rule is applied) it may be interpreted that a wake-up time (and/or parameters) (related to SL DRX (and/or Uu DRX)) signaled by an entity that satisfies (some or all or a combination of) the following conditions (and/or a wake-up time (and/or parameters) (related to SL DRX (and/or Uu DRX)) (finally) determined by the corresponding entity) (and/or a wake-up time (and/or parameters) (related to SL DRX (and/or Uu DRX)) that satisfies (some or all or a combination of) the following conditions) may have a relatively higher priority (e.g., based on a wake-up time (and/or parameters) (related to SL DRX (and/or Uu DRX)) having a (relatively) higher priority, a wake-up time (and/or parameters) (related to SL DRX (and/or Uu DRX)) having a (relatively) lower priority may be aligned/adjusted (as much as possible) (and/or an entity with a wake-up time (and/or parameters) (related to SL DRX (and/or Uu DRX)) having a (relatively) lower priority may align/adjust its own (as much as possible))), and/or may be a reference wake-up time (and/or parameters) (hereinafter referred to as REFER PARA) used for the alignment operation of wake-up times (and/or parameters) (related to SL DRX) between UEs (and/or the alignment operation between a wake-up time (and/or parameters) related to Uu DRX and a wake-up time (and/or parameters) related to SL DRX) (e.g., REFER PARA may be used by other entities (e.g., a UE, a base station, an RSU) (and/or receiving entity) to align a wake-up time (and/or parameters) (related to SL DRX) (as much as possible) based on it (and/or in the alignment operation between a wake-up time (and/or parameters) related to Uu DRX and a wake-up time (and/or parameters) related to SL DRX, to align/adjust (the former or the latter) (as much as possible) based on it)). Furthermore, for example, if the proposed method is applied, when signaling a (preferred) wake-up time (and/or parameters) (related to SL DRX (and/or Uu DRX)) (between UEs and/or between a base station (or an RSU) and a UE) (e.g., PC5 RRC, (SL) MAC CE, (Uu) RRC, (Uu) SIB) (and/or when exchanging assistance information and/or when reporting a received wake-up time (and/or parameters) (related to SL DRX (and/or Uu DRX)) (and/or when reporting a (preferred) wake-up time (and/or parameters) (related to SL DRX (and/or Uu DRX)) of a target/peer (RX or TX) entity (e.g., UE, RSU) (related to SL communication))), information may also be transmitted together, such as information whether it is located within a base station/network coverage (e.g., in-coverage, out-of-coverage) (of an entity signaling/transferring such information and/or of an entity that (finally) determines the information being signaled/transferred and/or of a (target/peer) entity that provides the information being reported), an entity type (e.g., UE (type) (e.g., power saving UE, vehicle UE), RSU, base station), an SL MODE (e.g., MODE 1, MODE 2), an (associated) cast type, an (associated) service type (and/or priority), (associated service-related) QoS requirements (and/or PQI parameters) (e.g., reliability, latency, minimum communication range), an (associated) groupcast-related group size (e.g., number of members in the group), a retransmission type (e.g., HARQ feedback-based retransmission, blind retransmission) (and/or information on whether a HARQ feedback ENABLED MAC PDU (or a HARQ feedback DISABLED MAC PDU) is transmitted), and/or a HARQ feedback type (e.g., NACK ONLY feedback type (based on TX-RX distance), ACK/NACK feedback type), information on whether a relay operation (and/or an inter-UE coordination operation) (related to an (SL DRX (and/or Uu DRX)) wake-up time (and/or parameters)) is performed, information on whether RRC connection (with a base station) is established (and/or a connection state (e.g. RRC CONNECTED, IDLE, INACTIVE)), (physical) ID information of a (serving/camping) cell (related to) (a (preferred) (SL DRX (and/or Uu DRX)) wake-up time (and/or parameters)), entity ((type) information) that (finally) determines a (signaled/transferred and/or reported) wake-up time (and/or parameters) (related to SL DRX (and/or Uu DRX)) (e.g., a base station, an RSU, a UE), priority (and/or whether it is REFER PARA) information of a (signaled/transferred and/or reported) wake-up time (and/or parameters) (related to SL DRX (and/or Uu DRX)), information on whether the operation was performed to align/adjust a wake-up time (and/or parameters) related to SL DRX (or Uu DRX) based on a wake-up time (and/or parameters) related to Uu DRX (or SL DRX) (as much as possible), information on how many hops (and/or relay (operations)) the signaled/received (preferred) wake-up time (and/or parameters) (related to SL DRX (and/or Uu DRX)) is from a wake-up time (and/or parameters) (and/or REFER PARA) (related to SL DRX (and/or Uu DRX)) provided by the (final) determination entity on which it is referenced/based (and/or information on how many (maximum) number of alignment (operations) the signaled/received (preferred) wake-up time (and/or parameters) (related to SL DRX (and/or Uu DRX)) is generated/determined) (and/or the number of wake-up times (and/or parameters) (related to SL DRX (and/or Uu DRX)) for which alignment operation has been performed for the signaled/received (preferred) wake-up times (and/or parameters) (related to SL DRX (and/or Uu DRX)) (as much as possible) (and/or the number of entities (e.g., a UE, an RSU, a base station) and/or the number of (SL) (PC5) links/connections)), etc. For example, it may be configured that the base station finally determines a wake-up time (and/or parameters) between in-coverage UEs, and the UE that satisfy (some or all of) the following conditions finally determines a wake-up time (and/or parameters) between an in-coverage UE and an out-of-coverage UE (and/or between out-of-coverage UEs). In addition, for example, if there are multiple wake-up times (and/or parameters) (related to SL DRX (and/or Uu DRX)) having equal priority (from the UE perspective) (and/or if there are multiple wake-up times (and/or parameters) (related to SL DRX (and/or Uu DRX)) determined by the same (priority) (final) entity (e.g., a UE, an RSU, a base station)), it may be configured to consider/assume that a wake-up time (and/or parameters) (related to SL DRX (and/or Uu DRX)) ((finally) determined by an entity) that satisfy (some or all or a combination of) the following conditions has a relatively higher priority (e.g., this can be interpreted as a kind of tie-breaking). In addition, for example, when a (TX or RX) UE receives (preferred) wake-up times (and/or parameters) (related to SL DRX (and/or Uu DRX)) from a plurality of ((different) target/peer) (RX or TX) entities (e.g., a UE, an RSU), it may be configured to report/signal only a (pre-configured number of) representative wake-up times (and/or parameters) (related to SL DRX (and/or Uu DRX)) after performing the alignment/adjustment operation (as much as possible) based on wake-up times (and/or parameters) (related to SL DRX (and/or Uu DRX)) having a relatively higher priority (among them) proposed in the present disclosure.

For example, an entity that satisfies (some or all or a combination of) the following conditions may be configured to determine a wake-up time (related to SL DRX) (e.g., it may be interpreted that a UE receiving the wake-up time may follow it and/or adjust a wake-up time to align). Herein, in another example, (if such a rule is applied) it may be interpreted that a (SL DRX) wake-up time signaled by an entity that satisfies (some or all or a combination of) the following conditions has a relatively higher priority (e.g., based on a wake-up time having a higher priority, a wake-up time having a lower priority is aligned/adjusted), and/or it may be interpreted as aligning based on a reference wake-up time (hereinafter referred to as REFER PARA), which is used for the wake-up time aligning operation between UEs and the aligning operation between SL DRX-related wake-up times. Furthermore, for example, if the proposed method is applied, when signaling a wake-up time (e.g., PC5 RRC, MAC CE, RRC, SIB), information may also be transmitted together, such as information whether it is located within a base station/network coverage, an entity type, an SL MODE, an (associated) cast type, an (associated) service type (and/or priority), (associated service-related) QoS requirements, an (associated) groupcast-related group size (e.g., number of members in the group), a retransmission type (e.g., HARQ feedback-based retransmission, blind retransmission), information on whether a relay operation related to an (SL DRX) wake-up time is performed, information on whether RRC connection (with a base station) is established, (physical) ID information of a (serving/camping) cell, an entity that (finally) determines a (signaled/transferred and/or reported) wake-up time related to SL DRX, priority (and/or whether it is REFER PARA) information of a wake-up time (related to SL DRX), information on whether the operation was performed to align/adjust a wake-up time related to SL DRX based on a wake-up time related to Uu DRX, information on how many hops the signaled/received wake-up time is from a wake-up time provided by the (final) determination entity on which it is referenced/based (and/or information on how many number of alignment (operations) the signaled/received wake-up time is generated/determined)), etc. For example, it may be configured that the base station finally determines a wake-up time between in-coverage UEs, and the UE that satisfy (some or all of) the following conditions finally determines a wake-up time between an in-coverage UE and an out-of-coverage UE. In addition, for example, if there are multiple wake-up times having equal priority (from the UE perspective), it may be configured to consider/assume that a wake-up time (determined by an entity) that satisfy the following conditions has a relatively higher priority (e.g., this can be interpreted as a kind of tie-breaking). In addition, for example, when a (TX or RX) UE receives (preferred) wake-up times related to SL DRX from a plurality of (target/peer) (RX or TX) entities (e.g., a UE, an RSU), it may be configured to report/signal only a representative wake-up time related to SL DRX after performing the alignment/adjustment operation based on wake-up times related to SL DRX having a relatively higher priority (among them) proposed in the present disclosure.

OPTION 1) A UE located within (or outside) a coverage of the base station/network (or a UE that has received a wake-up time (and/or parameters) (related to SL DRX) from the base station/network (or pre-configuration), or a UE that is in RRC connected (and/or idle (and/or inactive) state) with the base station) (and/or a wake-up time (and/or parameters) (related to SL DRX (and/or Uu DRX)) used (and/or preferred and/or provided) by it)

For example, the UE located within the coverage of the base station/network (or the UE that has received the wake-up time from the base station/network, or the UE that is in RRC connected state with the base station/network) may meet the above condition.

Herein, as a specific example, between an in-coverage UE and an out-of-coverage UE, it may be considered that a UE that finally determines a wake-up time (and/or parameters) (related to SL DRX) is the in-coverage UE (or the out-of-coverage UE), and/or it may be considered that a wake-up time (and/or parameters) (related to SL DRX) signaled by the in-coverage UE (or the out-of-coverage UE) has a relatively higher priority than a wake-up time (and/or parameters) (related to SL DRX) signaled by the out-of-coverage UE (or the in-coverage UE), and/or it may be considered as REFER PARA.

Herein, as a specific example, between a UE in an RRC connected state and a UE in an idle state (and/or a UE in an inactive state and/or an out-of-coverage UE), it may be considered that a UE that finally determines a wake-up time (and/or parameters) (related to SL DRX) is the UE in the RRC connected state (or the UE in the idle state (and/or the UE in the inactive state and/or the out-of-coverage UE)), and/or it may be considered that a wake-up time (and/or parameters) (related to SL DRX) signaled by the UE in the RRC connected state (or the UE in the idle state and/or the UE in the inactive state and/or the out-of-coverage UE)) has a relatively higher priority than a wake-up time (and/or parameters) (related to SL DRX) signaled by the UE in the idle state (and/or the UE in the inactive state and/or the out-of-coverage UE) (or the UE in the RRC connected state), and/or it may be considered as REFER PARA.

OPTION 2) An RSU (that controls/schedules SL communication and related parameters) (and/or a wake-up time (and/or parameters) (related to SL DRX (and/or Uu DRX)) used (and/or preferred and/or provided) by it)

For example, the RSU (that controls/schedules SL communications and related parameters) and/or the wake-up time (related to SL DRX) used by it may meet the above condition.

Herein, as a specific example, it may be considered that a wake-up time (and/or parameters) (related to SL DRX) between different UEs is determined by an RSU (or to follow what it signals), and/or it may be considered that a wake-up time (and/or parameters) (related to SL DRX) signaled by an RSU has a relatively higher priority than a wake-up time (and/or parameters) (related to SL DRX) signaled by other entities (e.g., UE), and/or it may be considered as REFER PARA.

OPTION 3) A UE performing an SL MODE 1 (or SL MODE 2) operation (e.g., scheduling of UE's SL transmission resources directly by the base station) (and/or a wake-up time (and/or parameters) (related to SL DRX (and/or Uu DRX)) used (and/or preferred and/or provided) by it)

For example, the UE performing the SL MODE 1 operation may meet the above condition.

Herein, as a specific example, between a UE performing MODE 1 communication and a UE performing the MODE 2 communication, it may be considered that a UE that finally determines a wake-up time (and/or parameters) (related to SL DRX) is the UE performing the MODE 1 communication (or the UE performing the MODE 2 communication), and/or it may be considered that a wake-up time (and/or parameters) (related to SL DRX) signaled by the UE performing the MODE 1 communication (or the UE performing the MODE 2 communication) has a relatively higher priority than a wake-up time (and/or parameters) (related to SL DRX) signaled by the UE performing the MODE 2 communication (or the UE performing the MODE 1 communication), and/or it may be considered as REFER PARA.

OPTION 4) A UE performing communication with a pre-configured cast type (e.g., groupcast (and/or broadcast and/or unicast)) (and/or groupcast communication based on the number of member UEs greater than or equal to (or less than or equal to) a pre-configured threshold number (and/or based on the relatively large (or small) number of member UEs) and/or communication related to a service (and/or LCH data) with a higher (or lower) priority than a pre-configured threshold level (and/or with a relatively higher (or lower) priority) and/or communication related to a service with a higher (or lower) reliability (and/or shorter (or longer) latency and/or longer (or shorter) minimum communication distance) requirement than a pre-configured threshold (and/or with a relatively higher (or lower) reliability (and/or shorter (or longer) latency and/or longer (or shorter) minimum communication distance) requirement) and/or communication related to a pre-configured specific service (and/or LCH data) and/or communication related to HARQ feedback-based (or blind) retransmission and/or communication with a pre-configured HARQ feedback option/type (e.g., (TX-RX distance-based) NACK ONLY feedback, ACK/NACK feedback)) (and/or a wake-up time (and/or parameters) (related to SL DRX (and/or Uu DRX)) used (and/or preferred and/or provided) by it)

For example, the UE performing the communication with the pre-configured cast type, and/or the communication related to the service with the priority higher than the pre-configured threshold level, and/or the communication related to the service with the reliability requirement higher than the pre-configured threshold, and/or the pre-configured specific service may meet the above condition.

Herein, as a specific example, between a UE performing groupcast (and/or broadcast) communication and a UE performing unicast (and/or groupcast (and/or broadcast)) communication, it may be considered that a UE that finally determines a wake-up time (and/or parameters) (related to SL DRX) is the UE performing the groupcast (and/or broadcast and/or unicast) communication, and/or it may be considered that a wake-up time (and/or parameters) (related to SL DRX) signaled by the UE performing the groupcast (and/or broadcast and/or unicast) communication has a relatively higher priority than a wake-up time (and/or parameters) (related to SL DRX) signaled by the UE performing the unicast (and/or groupcast (and/or broadcast)) communication, and/or it may be considered as REFER PARA.

OPTION 5) A UE (and/or an RSU and/or a base station) that relays (and/or forwards for an inter-UE coordination operation) wake-up time (and/or parameter) information (related to SL DRX (and/or Uu DRX)) (e.g., it may be interpreted as an entity that performs the inter-UE coordination operation) (and/or a wake-up time (and/or parameters) (related to SL DRX (and/or Uu DRX)) used (and/or preferred and/or provided) by it)

For example, the UE that relays the wake-up time information (related to SL DRX) may meet the above condition.

OPTION 6) A pre-configured entity (e.g., UE) (from the base station/network or by the (UE) upper/higher layer (e.g., V2X layer, application layer)) (and/or the upper/higher layer of the UE (e.g., V2X layer, application layer)) (and/or a wake-up time (and/or parameters) (related to SL DRX (and/or Uu DRX)) used (and/or preferred and/or provided) by it)

For example, the pre-configured entity (e.g., UE) (and/or the upper/higher layer of the UE (e.g., V2X layer, application layer)) may meet the above condition.

OPTION 7) A (serving) base station (or an RSU or a UE) (and/or a wake-up time (and/or parameters) (related to SL DRX (and/or Uu DRX)) used (and/or preferred and/or provided) by it)

For example, the (serving) base station may meet the above condition.

OPTION 8) A UE receiving service data (or a UE transmitting service data or a group leader UE (e.g., platooning)) (and/or a wake-up time (and/or parameters) (related to SL DRX (and/or Uu DRX)) used (and/or preferred and/or provided) by it)

For example, the UE receiving service data (or the UE transmitting service data or the group leader UE (e.g., platooning)) may be meet the above condition.

OPTION 9) A (preferred) wake-up time (and/or parameters) (related to SL DRX (and/or Uu DRX)) (and/or a UE (or a (serving) base station or an RSU) providing them) related to the number of hops (and/or the (maximum) number of alignment (operations) and/or the number of relay (operations)) that is relatively less (or greater) (and/or than a pre-configured threshold) (from a wake-up time (and/or parameters) (and/or REFER PARA) (related to SL DRX (and/or Uu DRX)) provided by the (final) determination entity)

For example, the wake-up time (related to SL DRX) that is a relatively small number of hops from REFER PARA and/or the wake-up time provided by the determination entity may correspond to the above condition.

Herein, for example, it may be configured/considered that a (preferred) wake-up time (and/or parameters) (related to SL DRX (and/or Uu DRX)) related to the number of hops (and/or the (maximum) number of alignment (operations) and/or the number of relay (operations)) that is greater (or less) than a pre-configured threshold is invalid/not considered.

OPTION 10) A (preferred) wake-up time (and/or parameters) (related to SL DRX (and/or Uu DRX)) (and/or a UE (or a (serving) base station or an RSU) providing them) with the number of wake-up times (and/or parameters) (related to SL DRX (and/or Uu DRX)) for which alignment operation has been performed (as much as possible) (and/or the number of entities (e.g., a UE, an RSU, a base station) and/or the number of (SL) (PC5) links/connections) that is relatively greater (or less) (and/or than a pre-configured threshold)

For example, the wake-up time (related to SL DRX) with the relatively large number of wake-up times (related to SL DRX) for which alignment operation has been performed and/or with the relatively large number of entities (e.g., a UE, an RSU, a base station) and/or with the relatively large number of (SL) (PC5) links/connections may meet the above condition.

Herein, for example, it may be configured/considered that a (preferred) wake-up time (and/or parameters) (related to SL DRX (and/or Uu DRX)) with the number of wake-up times (and/or parameters) (related to SL DRX (and/or Uu DRX)) for which alignment operation has been performed (as much as possible) (and/or the number of entities (e.g., a UE, an RSU, a base stations) and/or the number of (SL) (PC5) links/connections) that is less (or greater) than a pre-configured threshold is invalid/not considered.

OPTION 11) A UE (and/or an RSU and/or a base station) with an (SL or Uu) measurement (e.g., PSCCH (and/or PSSCH) DM-RS RSRP, Uu (SSB/RS) RSRP) value related to a signaled/received (preferred) wake-up time (and/or parameters) (related to SL DRX (and/or Uu DRX)) that is relatively greater (or less) (and/or than a pre-configured threshold) (and/or a wake-up time (and/or parameters) (related to SL DRX (and/or Uu DRX)) used (and/or preferred and/or provided) by it)

For example, the UE with the relatively large measurement value (e.g., PSCCH (and/or PSSCH) DM-RS RSRP, Uu (SSB/RS) RSRP) related to the signaled/received wake-up time (related to SL DRX) may meet the above condition.

Herein, for example, it may be configured/considered that a UE (and/or an RSU and/or a base station) with an (SL or Uu) measurement value related to a signaled/received (preferred) wake-up time (and/or parameters) (related to SL DRX (and/or Uu DRX)) that is relatively less (or greater) (and/or than a pre-configured threshold) is invalid/not considered.

OPTION 12) A wake-up time (and/or parameters) related to SL DRX (or Uu DRX) for which the alignment/adjustment operation has been performed (or not been performed) (as much as possible) with a wake-up time (and/or parameters) related to Uu DRX (or SL DRX)

For example, the wake-up time related to SL DRX for which the alignment/adjustment operation has been performed with the wake-up time related to Uu DRX may meet the above condition.

OPTION 13) A wake-up time (and/or parameters) (related to SL DRX (and/or Uu DRX)) related to an SL communication/service (and/or an SL (PC5) link/connection and/or a cast type and/or an (L1 or L2) destination (and/or source) ID (pair)) that the (TX or RX) UE is (currently) interested in (and/or performing) (and/or a UE (or an RSU or a base station) providing them)

For example, the wake-up time related to the SL communication/service of interest to the UE may meet the above condition.

As another example, based on the (some) proposed rules described above, if an entity (hereinafter DECI_ENTY) (e.g., a (serving/connected) base station, an RSU) that (finally) determines a wake-up time (and/or parameters) (and/or REFER PARA) (related to SL DRX (and/or Uu DRX)) is configured, the UE may be configured to first request/receive (and/or receive confirmation of) a wake-up time (and/or parameters) (related to SL DRX) (of the UE) from the DECI_ENTY, and then perform the alignment (and/or exchange) operation of the wake-up time (and/or parameters) (related to SL DRX) with other UEs (and/or RSUs) based on this.

For example, when transmitting a MAC PDU for which SL HARQ feedback is required (through a PSFCH), (reception (and/or transmission)) resource pools to which random selection based resource selection and partial sensing (and/or full sensing) based resource selection are applied (and/or (reception (and/or transmission)) resource pools to which random selection (and/or partial sensing) based resource selection and full sensing based resource selection are applied) may be configured independently (and/or to be non-overlapping (partially or entirely) (in the time (and/or frequency) domain)). If such a rule is applied, for example, the UE may expect that each of (reception (and/or transmission)) resource pools in which PSFCH resources are configured is configured independently (and/or to be non-overlapping (partially or entirely) (in the time (and/or frequency) domain)) for random selection based resource selection and partial sensing (and/or full sensing) based resource selection (and/or random selection (and/or partial sensing) based resource selection and full sensing based resource selection) (and/or that a PSFCH resource in a resource pool in which random selection based resource selection is allowed and a PSFCH resource in a resource pool in which partial sensing (and/or full sensing) based resource selection is allowed (and/or a PSFCH resource in a resource pool in which random selection (and/or partial sensing) based resource selection is allowed and a PSFCH resource in a resource pool in which full sensing based resource selection is allowed) are configured independently (and/or to be non-overlapping (partially or entirely) (in the time (and/or frequency) domain)) (e.g., the former and the latter can be the same resource pool (physically))) (e.g., it may be interpreted that, for a resource pool in which a PSFCH resource is not configured, random selection-based resource selection and partial sensing (and/or full sensing) based resource selection may (exceptionally) be allowed simultaneously, and/or for MAC PDU transmission for which SL HARQ feedback is not required (through a PSFCH), random selection based resource selection and partial sensing (and/or full sensing) based resource selection may (exceptionally) be allowed simultaneously in the same resource pool (and/or a resource pool in which random selection based resource selection is allowed and a resource pool in which partial sensing (and/or full sensing) based resource selection is allowed (and/or a resource pool in which random selection (and/or partial sensing) based resource selection is allowed and a resource pool in which full sensing based resource selection is allowed) may (exceptionally) be configured to overlap (partially or entirely) (in the time (and/or frequency) domain))).

For example, whether or not the above rule is applied (and/or the parameter value related to the proposed method of the present disclosure) may be specifically (or differently or independently) configured/allowed for at least one of elements/parameters (or for each of elements/parameters), such as a service type (and/or an (LCH or service) priority and/or a QoS requirement (e.g., latency, reliability, minimum communication range) and/or a PQI parameter) (and/or a HARQ feedback enabled (and/or disabled) LCH/MAC PDU (transmission) and/or a CBR measurement of a resource pool and/or an SL cast type (e.g., unicast, groupcast, broadcast) and/or an SL groupcast HARQ feedback option (e.g., NACK ONLY feedback, ACK/NACK feedback, NACK ONLY feedback based on TX-RX distance) and/or an SL mode 1 CG type (e.g., SL CG type 1/2) and/or an SL mode type (e.g., mode 1/2) and/or a resource pool and/or whether a PSFCH resource is configured for a resource pool and/or a source (L2) ID (and/or a destination (L2) ID) and/or a PC5 RRC connection link and/or an SL link and/or a connection state (with the base station) (e.g., RRC_CONNECTED state, RRC_IDLE state, RRC_INACTIVE state) and/or an SL HARQ process (ID)) and/or whether the SL DRX operation (of the TX UE or the RX UE) is performed and/or whether the UE is a power saving (TX or RX) UE and/or a case in which PSFCH TX and PSFCH RX overlap (and/or multiple PSFCH TXs (exceeding UE capability)) (from the point of view of a specific UE) (and/or a case in which PSFCH TX (and/or PSFCH RX) is skipped) and/or a case in which the RX UE actually (successfully) receives PSCCH (and/or PSSCH) (re)transmission from the TX UE). Furthermore, the term "configured/configure" (or "assigned/assign") in the present disclosure can be interpreted to mean that the base station informs the UE through a predefined (physical layer or higher layer) channel/signal (e.g., SIB, RRC, MAC CE) (and/or being provided through a pre-configuration and/or the UE informs another UE through a predefined (physical layer or higher layer) channel/signal (e.g., SL MAC CE, PC5 RRC)). In addition, in the present disclosure, the term "PSFCH" may be interpreted as or extended to "(NR or LTE) PSSCH (and/or (NR or LTE) PSCCH) (and/or (NR or LTE) SL SSB (and/or UL channel/signal))". Furthermore, the proposed methods of the present disclosure may be combined with each other and extended (in new forms).

FIG. 14 shows a method for performing wireless communication by a first device, based on an embodiment of the present disclosure. The embodiment of FIG. 14 may be combined with various embodiments of the present disclosure.

Referring to FIG. 14, in step S1410, the first device may obtain at least one sidelink (SL) discontinuous reception (DRX) configuration. In step S1420, the first device may receive, from a second device through a physical sidelink control channel (PSCCH), first sidelink control information (SCI) for scheduling of a physical sidelink shared channel (PSSCH), based on an SL DRX configuration among the at least one SL DRX configuration. In step S1430, the first device may receive, from the second device through the PSSCH, second SCI including a source ID and a destination ID, and a medium access control (MAC) protocol data unit (PDU).

Additionally, for example, the first device may select, based on that a service of interest by the first device is related to the destination ID, the SL DRX configuration related to the destination ID among the at least one SL DRX configuration. For example, the SL DRX configuration may be selected based on a QoS requirement related to the destination ID. For example, the first SCI may be detected within an active time of the SL DRX configuration related to the destination ID. Additionally, for example, the first device may transmit, to a base station, assistance information related to the SL DRX configuration. For example, the assistance information may include information regarding the SL DRX configuration related to the service of interest. For example, the information regarding the SL DRX configuration may include an active time of the SL DRX configuration or a parameter related to an SL DRX operation. For example, the assistance information may include information regarding a type of the service of interest. For example, the assistance information may include information regarding a Quality of Service (QoS) requirement related to the service of interest. For example, the assistance information may include a PC5 QoS Identifier (PQI) related to the service of interest. For example, the assistance information may include information regarding whether an SL DRX operation is applied for each destination ID or PQI related to the service of interest.

For example, based on establishment of a radio resource control (RRC) connection between the second device and a base station, the SL DRX configuration may be determined by the base station, and the first device may obtain the SL DRX configuration determined by the base station from the base station through the second device. For example, based on no establishment of the RRC connection between the second device and the base station, the SL DRX configuration may be determined by the second device, and the first device may obtain the SL DRX configuration determined by the second device from the second device.

For example, information reported to a base station by the second device may include information regarding whether an SL DRX operation is applied for each destination ID or PQI related to a service of interest. For example, the service of interest may be a service that the second device is interested in transmitting. For example, the service of interest may be a service that the first device is interested in receiving.

Additionally, for example, the first device may determine, based on a relationship between the first device and the second device, whether the second device satisfies qualification as an entity that determines the SL DRX configuration. Additionally, for example, the first device may select, based on the determination that the second device satisfies the qualification, the SL DRX configuration determined by the second device among the at least one SL DRX configuration.

The proposed method can be applied to device(s) based on various embodiments of the present disclosure. First, the processor 102 of the first device 100 may obtain at least one sidelink (SL) discontinuous reception (DRX) configuration. In addition, the processor 102 of the first device 100 may control the transceiver 106 to receive, from a second device through a physical sidelink control channel (PSCCH), first sidelink control information (SCI) for scheduling of a physical sidelink shared channel (PSSCH), based on an SL DRX configuration among the at least one SL DRX configuration.

In addition, the processor 102 of the first device 100 may control the transceiver 106 to receive, from the second device through the PSSCH, second SCI including a source ID and a destination ID, and a medium access control (MAC) protocol data unit (PDU).

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: obtain at least one sidelink (SL) discontinuous reception (DRX) configuration; receive, from a second device through a physical sidelink control channel (PSCCH), first sidelink control information (SCI) for scheduling of a physical sidelink shared channel (PSSCH), based on an SL DRX configuration among the at least one SL DRX configuration; and receive, from the second device through the PSSCH, second SCI including a source ID and a destination ID, and a medium access control (MAC) protocol data unit (PDU).

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: obtain at least one sidelink (SL) discontinuous reception (DRX) configuration; receive, from a second UE through a physical sidelink control channel (PSCCH), first sidelink control information (SCI) for scheduling of a physical sidelink shared channel (PSSCH), based on an SL DRX configuration among the at least one SL DRX configuration; and receive, from the second UE through the PSSCH, second SCI including a source ID and a destination ID, and a medium access control (MAC) protocol data unit (PDU).

Based on an embodiment of the present disclosure, a non-transitory computer readable storage medium storing instructions may be provided. For example, the instructions, when executed, may cause a first device to: obtain at least one sidelink (SL) discontinuous reception (DRX) configuration; receive, from a second device through a physical sidelink control channel (PSCCH), first sidelink control information (SCI) for scheduling of a physical sidelink shared channel (PSSCH), based on an SL DRX configuration among the at least one SL DRX configuration; and receive, from the second device through the PSSCH, second SCI including a source ID and a destination ID, and a medium access control (MAC) protocol data unit (PDU).

FIG. 15 shows a method for performing wireless communication by a second device, based on an embodiment of the present disclosure. The embodiment of FIG. 15 may be combined with various embodiments of the present disclosure.

Referring to FIG. 15, in step S1510, the second device may obtain at least one sidelink (SL) discontinuous reception (DRX) configuration. In step S1520, the second device may transmit, to a first device through a physical sidelink control channel (PSCCH), first sidelink control information (SCI) for scheduling of a physical sidelink shared channel (PSSCH), based on an SL DRX configuration among the at least one SL DRX configuration. In step S1530, the second device may transmit, to the first device through the PSSCH, second SCI including a source ID and a destination ID, and a medium access control (MAC) protocol data unit (PDU).

The proposed method can be applied to device(s) based on various embodiments of the present disclosure. First, the processor 202 of the second device 200 may obtain at least one sidelink (SL) discontinuous reception (DRX) configuration. In addition, the processor 202 of the second device 200 may control the transceiver 206 to transmit, to a first device through a physical sidelink control channel (PSCCH), first sidelink control information (SCI) for scheduling of a physical sidelink shared channel (PSSCH), based on an SL DRX configuration among the at least one SL DRX configuration. In addition, the processor 202 of the second device 200 may control the transceiver 206 to transmit, to the first device through the PSSCH, second SCI including a source ID and a destination ID, and a medium access control (MAC) protocol data unit (PDU).

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: obtain at least one sidelink (SL) discontinuous reception (DRX) configuration; transmit, to a first device through a physical sidelink control channel (PSCCH), first sidelink control information (SCI) for scheduling of a physical sidelink shared channel (PSSCH), based on an SL DRX configuration among the at least one SL DRX configuration; and transmit, to the first device through the PSSCH, second SCI including a source ID and a destination ID, and a medium access control (MAC) protocol data unit (PDU).

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: obtain at least one sidelink (SL) discontinuous reception (DRX) configuration; transmit, to a first UE through a physical sidelink control channel (PSCCH), first sidelink control information (SCI) for scheduling of a physical sidelink shared channel (PSSCH), based on an SL DRX configuration among the at least one SL DRX configuration; and transmit, to the first UE through the PSSCH, second SCI including a source ID and a destination ID, and a medium access control (MAC) protocol data unit (PDU).

Based on an embodiment of the present disclosure, a non-transitory computer readable storage medium storing instructions may be provided. For example, the instructions, when executed, may cause a second device to: obtain at least one sidelink (SL) discontinuous reception (DRX) configuration; transmit, to a first device through a physical sidelink control channel (PSCCH), first sidelink control information (SCI) for scheduling of a physical sidelink shared channel (PSSCH), based on an SL DRX configuration among the at least one SL DRX configuration; and transmit, to the first device through the PSSCH, second SCI including a source ID and a destination ID, and a medium access control (MAC) protocol data unit (PDU).

Based on various embodiments of the present disclosure, the TX UE and/or the RX UE can efficiently determine which SL DRX configuration to use for SL communication. Thereby, the power saving gain of the RX UE can be maximized and the reliability of the SL communication between the TX UE and the RX UE can be ensured.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
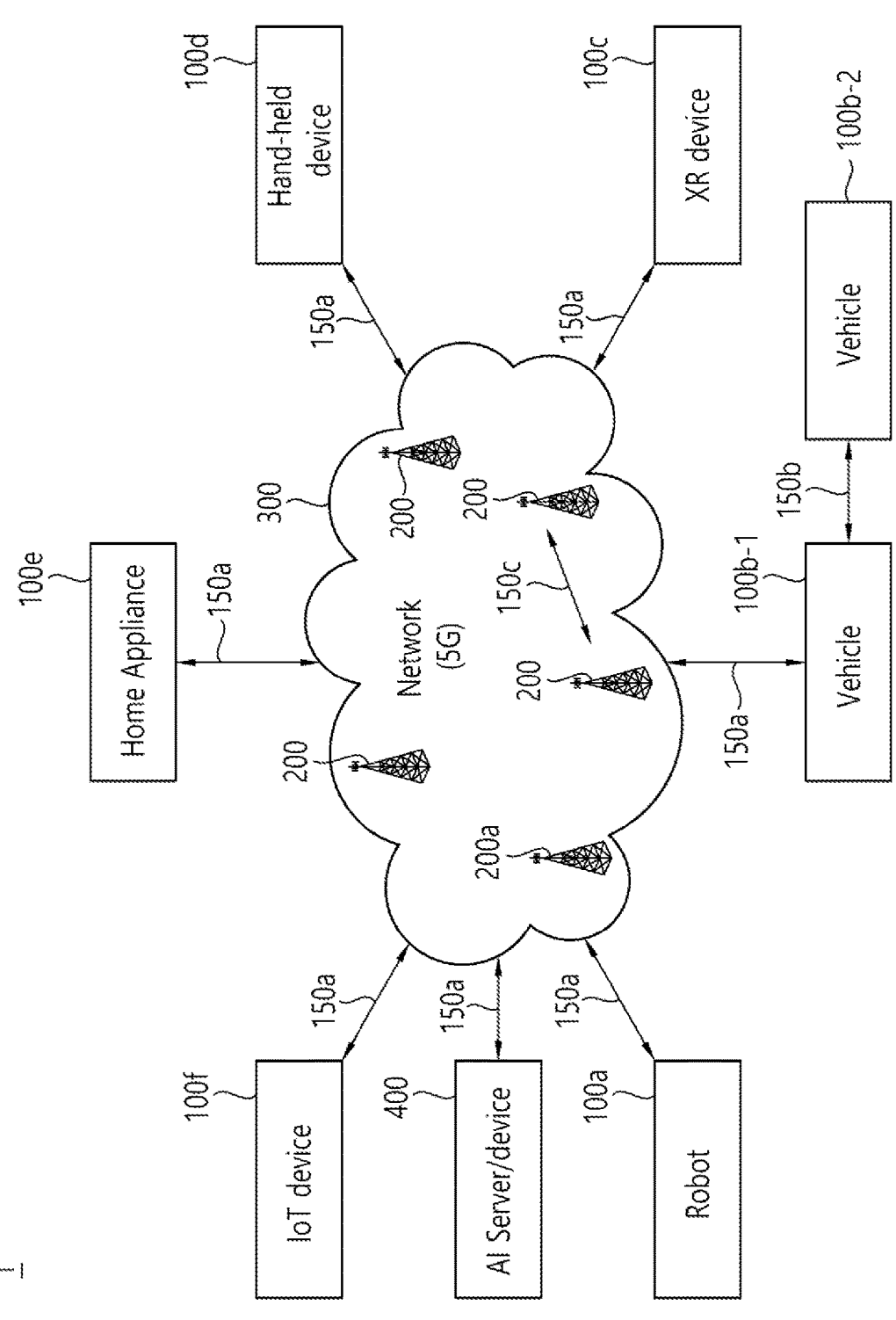
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
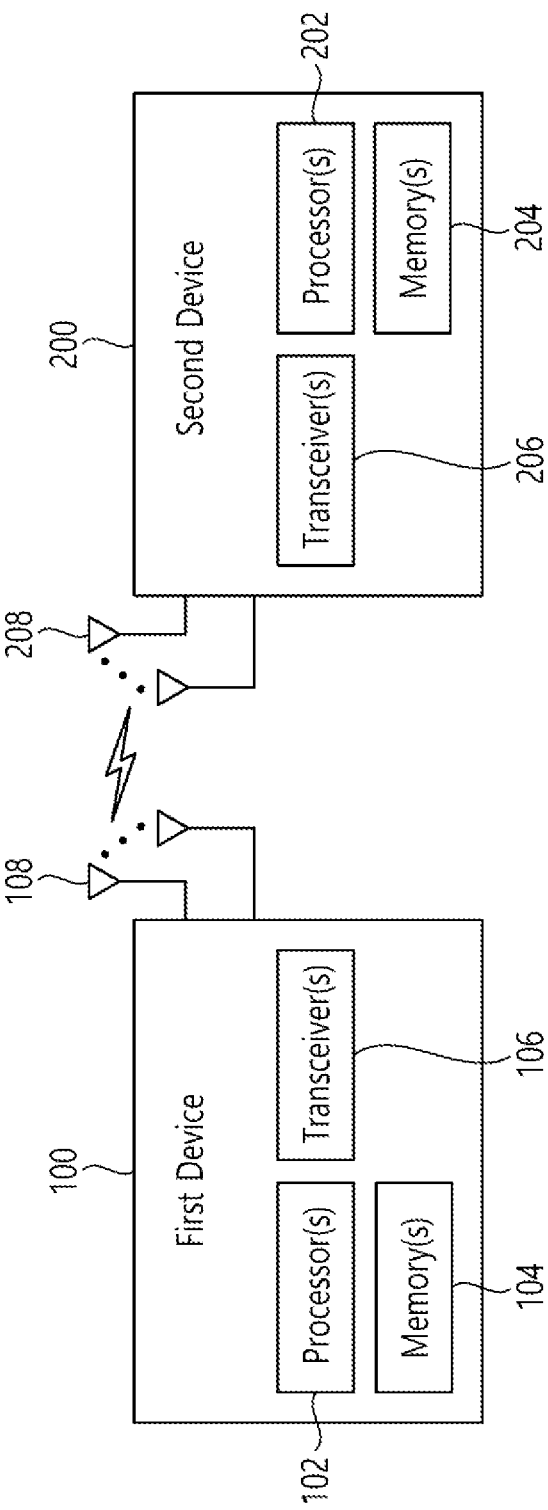
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
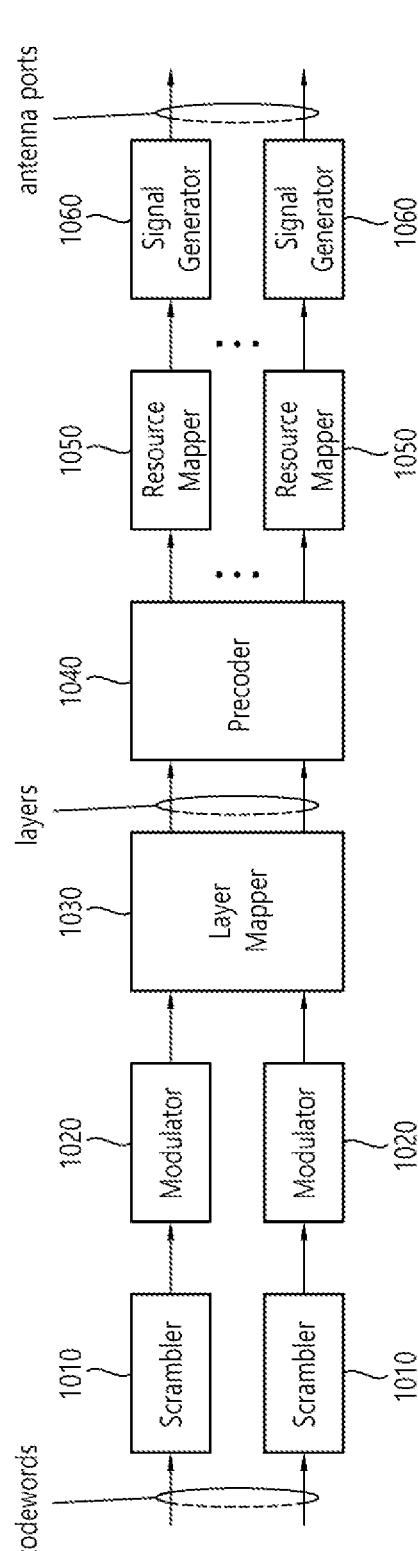
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
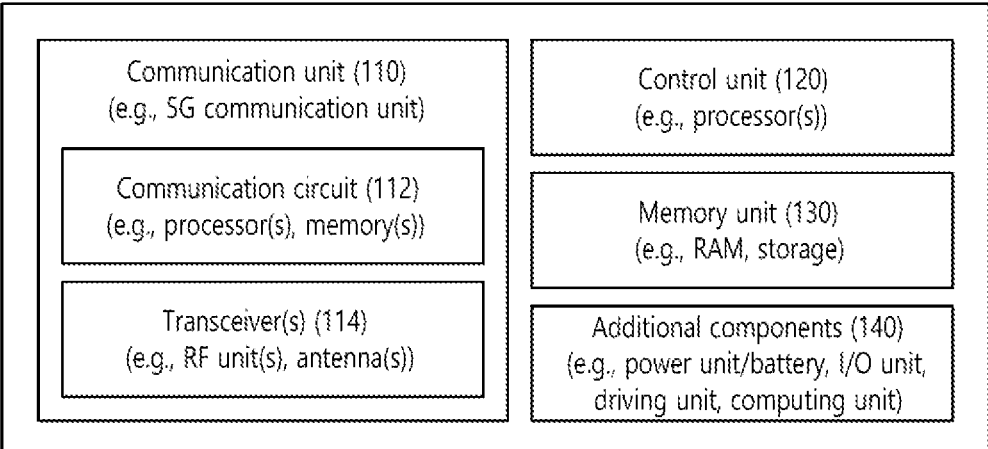
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
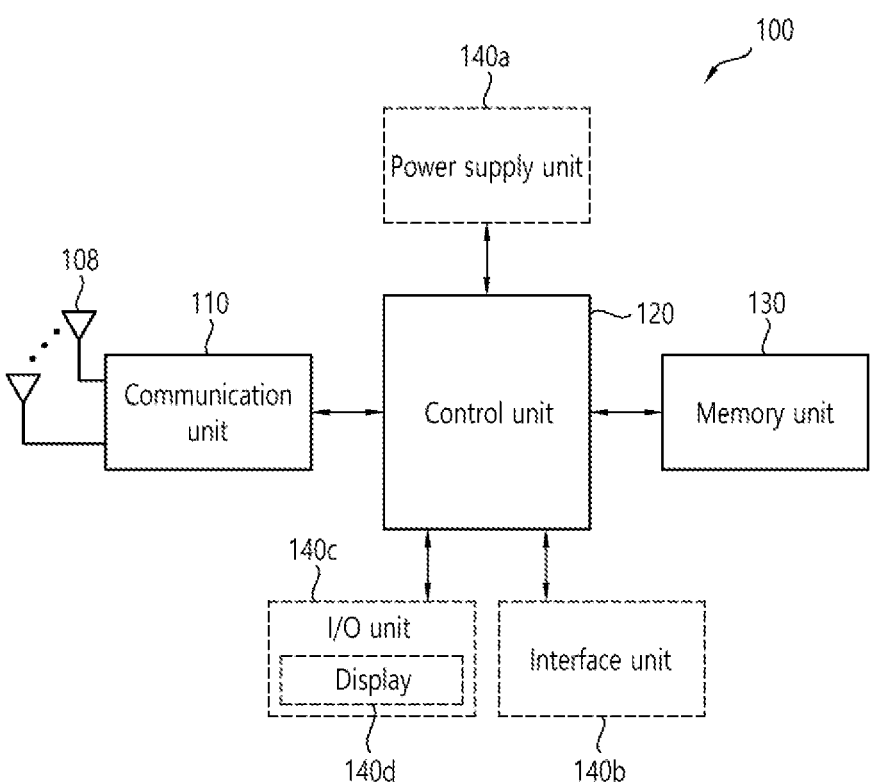
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 21:
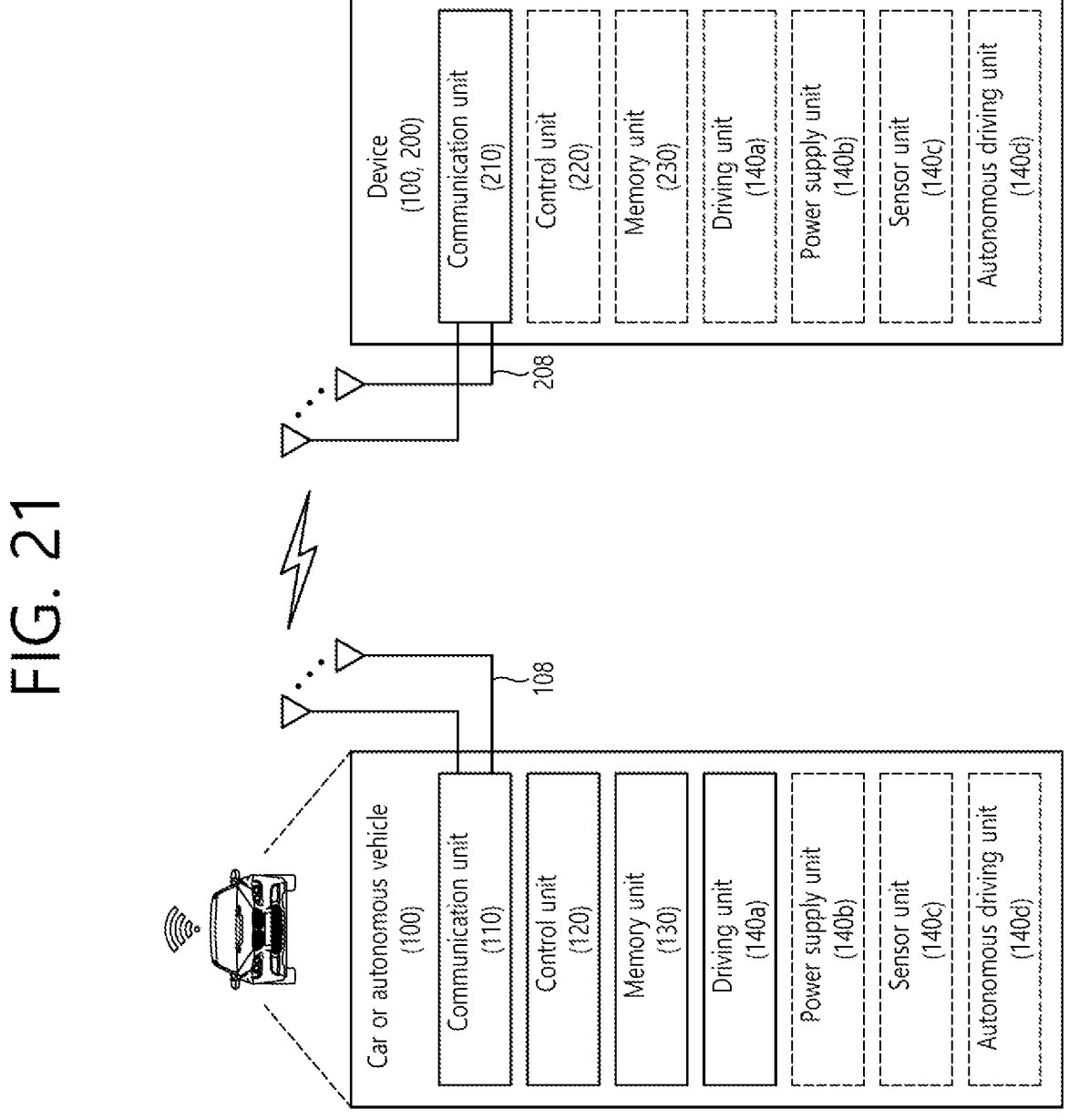
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, comprising:

obtaining, by a first device, sidelink (SL) discontinuous reception (DRX) related parameters;

determining, by the first device, a destination identifier (ID) based on a service type related to SL communication;

based on the first device being interested for reception for the destination ID, selecting, by the first device, a parameter for an SL DRX active time related to the destination ID among the SL DRX related parameters;

receiving, by the first device from a second device, through a physical sidelink control channel (PSCCH), first sidelink control information (SCI) for scheduling of a physical sidelink shared channel (PSSCH), based on the parameter for the SL DRX active time; and receiving, by the first device from the second device, through the PSSCH, a medium access control (MAC) protocol data unit (PDU), based on the parameter for the SL DRX active time.

2. The method of claim 1, wherein the parameter for the SL DRX active time is selected based on a Quality of Service (QoS) requirement related to the destination ID.

3. The method of claim 1, wherein the SCI is detected within the SL DRX active time.

4. The method of claim 1, further comprising:

transmitting, to a base station, assistance information related to an SL DRX configuration.

5. The method of claim 4, wherein the assistance information includes information regarding the SL DRX configuration related to a service of interest.

6. The method of claim 5, wherein the information regarding the SL DRX configuration includes an active time of the SL DRX configuration or a parameter related to an SL DRX operation.

7. The method of claim 4, wherein the assistance information includes information regarding a type of a service of interest.

8. The method of claim 4, wherein the assistance information includes information regarding a Quality of Service (QoS) requirement related to a service of interest or a PC5 QoS Identifier (PQI) related to the service of interest.

9. The method of claim 4, wherein the assistance information includes information regarding whether an SL DRX operation is applied for each destination ID or a PQI related to a service of interest.

10. The method of claim 1, wherein, based on establishment of a radio resource control (RRC) connection between the second device and a base station, the SL DRX related parameters are determined by the base station, and the first device obtains the SL DRX related parameters determined by the base station from the base station through the second device, and wherein, based on no establishment of the RRC connection between the second device and the base station, the SL DRX related parameters are determined by the second device, and the first device obtains the SL DRX related parameters determined by the second device from the second device.

11. The method of claim 1, wherein information reported to a base station by the second device includes information regarding whether an SL DRX operation is applied for each destination ID or a PQI related to a service of interest.

12. The method of claim 1, further comprising:

determining, based on a relationship between the first device and the second device, whether the second device satisfies qualification as an entity that determines the parameter for the SL DRX active time; and selecting, based on the determination that the second device satisfies the qualification, the parameter for the SL DRX active time determined by the second device among the SL DRX related parameters.

13. A first device, comprising:

at least one transceiver;

at least one processor; and at least one memory connected to the at least one processor and storing instructions that, based on being executed, cause the first device to perform operations comprising:

obtaining sidelink (SL) discontinuous reception (DRX) related parameters;

determining a destination identifier (ID) based on a service type related to SL communication;

based on the first device being interested for reception for the destination ID, selecting a parameter for an SL DRX active time related to the destination ID among the SL DRX related parameters;

receiving, from a second device, through a physical sidelink control channel (PSCCH), sidelink control information (SCI) for scheduling of a physical sidelink shared channel (PSSCH), based on the parameter for the SL DRX active time; and receiving, from the second device, through the PSSCH, a medium access control (MAC) protocol data unit (PDU), based on the parameter for the SL DRX active time.

14. The first device of claim 13, wherein the parameter for the SL DRX active time is selected based on a Quality of Service (QoS) requirement related to the destination ID.

15. The first device of claim 13, wherein the first SCI is detected within the SL DRX active time.

16. A processing device, comprising:

at least one processor; and at least one memory connected to the at least one processor and storing instructions that, based on being executed, cause a first device to perform operations comprising:

obtaining sidelink (SL) discontinuous reception (DRX) related parameters;

determining a destination identifier (ID) based on a service type related to SL communication;

based on the first device being interested for reception for the destination ID, selecting a parameter for an SL DRX active time related to the destination ID among the SL DRX related parameters;

receiving, from a second device, through a physical sidelink control channel (PSCCH), sidelink control information (SCI) for scheduling of a physical sidelink shared channel (PSSCH), based on the parameter for the SL DRX active time; and receiving, from the second device, through the PSSCH, a medium access control (MAC) protocol data unit (PDU), based on the parameter for the SL DRX active time.

17. The processing device of claim 16, wherein the parameter for the SL DRX active time is selected based on a Quality of Service (QoS) requirement related to the destination ID.

18. The processing device of claim 16, wherein the SCI is detected within the SL DRX active time.

* * * * *